United States Patent
Fukuda et al.

(10) Patent No.: US 11,003,810 B2
(45) Date of Patent: May 11, 2021

(54) SIMULATION SYSTEM AND SIMULATION METHOD

(71) Applicant: HITACHI, LTD., Tokyo (JP)

(72) Inventors: Koji Fukuda, Tokyo (JP); Yasuyuki Kudo, Tokyo (JP)

(73) Assignee: HITACHI, LTD., Tokyo (JP)

(*) Notice: Subject to any disclaimer, the term of this patent is extended or adjusted under 35 U.S.C. 154(b) by 404 days.

(21) Appl. No.: 15/502,303

(22) PCT Filed: Aug. 25, 2014

(86) PCT No.: PCT/JP2014/072132
§ 371 (c)(1),
(2) Date: Feb. 7, 2017

(87) PCT Pub. No.: WO2016/030938
PCT Pub. Date: Mar. 3, 2016

(65) Prior Publication Data
US 2017/0235862 A1 Aug. 17, 2017

(51) Int. Cl.
*G06F 30/20* (2020.01)
*G06F 7/58* (2006.01)
(Continued)

(52) U.S. Cl.
CPC ............ *G06F 30/20* (2020.01); *G06F 7/58* (2013.01); *G06F 17/16* (2013.01); *G06F 17/18* (2013.01);
(Continued)

(58) Field of Classification Search
CPC ...... G06F 17/5009; G06F 17/50; G06F 17/16; G06F 17/18; G06F 7/58; G06F 19/00; G06F 30/20; G06F 30/00
See application file for complete search history.

(56) References Cited

U.S. PATENT DOCUMENTS 6,778,929 B2   8/2004 Egi
2012/0290274 A1* 11/2012 Seningen ............ G06F 17/5036
                                          703/2

FOREIGN PATENT DOCUMENTS

JP   2004-117228 A   4/2004

OTHER PUBLICATIONS

Kleijnen, Jack PC, and Reuven Y. Rubinstein. "Optimization and sensitivity analysis of computer simulation models by the score function method." European Journal of Operational Research 88.3 (1996): 413-427. (Year: 1996).*

(Continued)

*Primary Examiner* — Omar F Fernandez Rivas
*Assistant Examiner* — Joshua E. Jensen
(74) *Attorney, Agent, or Firm* — Miles & Stockbridge, P.C.

(57) ABSTRACT

A simulation system obtains multiple random number vectors and a parameter vector and calculates realized values of the behavior of a stochastic system corresponding to each obtained random number vector. Based on each obtained random number vector, on the obtained parameter vector, and on a weight function, the system calculates the weight of each obtained random number vector regarding each of the parameters in the obtained parameter vector, and calculates an evaluation value of the behavior of the stochastic system corresponding to each obtained random number vector. Based on the calculated behavior evaluation value corresponding to each obtained random number vector and on the weight of each obtained random number vector regarding the parameter selected from the obtained parameter vector, the system calculates the sensitivity of an expected value for the behavior evaluation value of the stochastic system with regard to the selected parameter.

15 Claims, 8 Drawing Sheets

(51) Int. Cl.
  *G06F 17/16*     (2006.01)
  *G06F 17/18*     (2006.01)
  *G06F 111/08*    (2020.01)
  *G06F 111/10*    (2020.01)

(52) U.S. Cl.
  CPC ....... *G06F 2111/08* (2020.01); *G06F 2111/10* (2020.01)

(56) References Cited

OTHER PUBLICATIONS

Rubinstein, Reuven Y., and Alexander Shapiro. "Optimization of static simulation models by the score function method." Mathematics and Computers in Simulation 32.4 (1990): 373-392. (Year: 1990).*

* cited by examiner

FIG.8

| PERIOD / ITEM | '14/1 Q | '14/2 Q | '14/3 Q | '14/4 Q | '15/1 Q | '15/2 Q | |
|---|---|---|---|---|---|---|---|
| BUSINESS LOAN CATEGORY A | ¥~ | ¥~ | ¥~ | ¥~ | ¥~ | ¥~ | |
| BUSINESS LOAN CATEGORY B | ¥~ | ¥~ | ¥~ | ¥~ | ¥~ | ¥~ | |
| BUSINESS LOAN CATEGORY C | ¥~ | ¥~ | ¥~ | ¥~ | ¥~ | ¥~ | |
| HOUSING LOAN CATEGORY A | ¥~ | ¥~ | ¥~ | ¥~ | ¥~ | ¥~ | |
| HOUSING LOAN CATEGORY B | ¥~ | ¥~ | ¥~ | ¥~ | ¥~ | ¥~ | |
| HOUSING LOAN CATEGORY C | ¥~ | ¥~ | ¥~ | ¥~ | ¥~ | ¥~ | |
| CARD LOAN CATEGORY A | ¥~ | ¥~ | ¥~ | ¥~ | ¥~ | ¥~ | |
| CARD LOAN CATEGORY B | ¥~ | ¥~ | ¥~ | ¥~ | ¥~ | ¥~ | |
| CARD LOAN CATEGORY C | ¥~ | ¥~ | ¥~ | ¥~ | ¥~ | ¥~ | |
| SECURITIES DIVIDEND CATEGORY A | ¥~ | ¥~ | ¥~ | ¥~ | ¥~ | ¥~ | |
| SECURITIES DIVIDEND CATEGORY B | ¥~ | ¥~ | ¥~ | ¥~ | ¥~ | ¥~ | |
| SECURITIES DIVIDEND CATEGORY C | ¥~ | ¥~ | ¥~ | ¥~ | ¥~ | ¥~ | |
| | | | | | | | |

SIMULATION SYSTEM AND SIMULATION METHOD

TECHNICAL FIELD

The present invention relates to a simulation system and a simulation method.

BACKGROUND ART

When a system of interest is given, the behavior of the system is put into a model. Computers are then used to simulate the behavior of the system based on the model in order to predict the future behavior of the system. Simple deterministic models fail to describe certain types of physical phenomena or social phenomena involving numerous factors, for example. Each of these phenomena is generally described as a complicated stochastic model.

Under given initial conditions, the deterministic system always produces a uniquely determined future behavior. By contrast, the stochastic system has its future behavior distributed according to a certain probability distribution. To obtain statistics such as the expected value for an index of interest, for example, computers are required to run simulations.

The Monte Carlo simulation method is known as one way to predict and simulate the stochastic behavior of a stochastic system. The Monte Carlo simulation method involves running a large number of times a simulation in which the stochastic behavior existing in the target system is simulated using random numbers, thereby estimating the expected value for the index of interest. In that case, the larger the number of simulations run, the closer the expected value for the index of interest is thought to be to its true value in accordance with the law of large numbers.

As the background art of this technical field, there is JP-2004-117228-A (Patent Document 1). Patent Document 1 states that "There are provided a data acquisition step 0201 to acquire a long-range weather forecast announced by the Meteorology Agency addressing weather physical quantities, a weather time series model preparation step 0202 to prepare a time series model followed by the weather physical quantities, a weather physical quantity simulation step 0203 to simulate the weather physical quantities of an estimation point over an estimation time period as many times as the number of simulations, and a weather physical quantity estimation result output step 0204 to output the result of simulations of the weather physical quantities as the result of weather physical quantity estimation. Furthermore, the weather time series model preparation step 0202 is constituted from a weather time series model parameter estimation step 02021 and a weather time series model parameter correction step 02022" (see the Abstract).

PRIOR ART DOCUMENT

Patent Document

Patent Document 1: 2004-117228-A

SUMMARY OF THE INVENTION

Problem to be Solved by the Invention

Stochastic models targeted for Monte Carlo simulation, such as the weather physical quantities to be simulated as described in Patent Document 1, generally have numerous parameters. When Monte Carlo simulations are run in such cases, it may be desired to calculate not only the expected value for the index of interest under given parameter values but also the sensitivity of the expected value for the index of interest with regard to the parameter values. The sensitivity of the expected value for the index of interest with regard to parameter values is a differential coefficient representing how much the expected value for the index of interest is varied when given parameter values are infinitesimally changed.

Suppose the case where the parameters of a system are optimized, i.e., where the parameter values for maximizing the expected value for an index of interest are searched for within a tolerable range of parameter values. In that case, if the sensitivity of the expected value is obtained under given parameter values, the system parameters may be optimized using a known optimization method such as the gradient method or the Newton method.

However, it is not easy to obtain the sensitivity of the expected value for the index of interest with regard to each parameter value in Monte Carlo simulations, particularly if there are numerous parameters. In simplified terms, the sensitivity of the expected value for the index of interest with respect to a given parameter value is calculated by dividing the difference between the expected value for the index of interest under the given parameter value and the expected value for the index of interest under a parameter value infinitesimally changed from the given value by the amount of the infinitesimal change of the parameter.

Suppose that the technique discussed in Patent Document 1 is used to estimate the sensitivity of the expected value for the index of interest with regard to numerous parameter values. In that case, it is necessary to calculate the expected value for the index of interest with regard to the many parameter values each varied infinitesimally through the use of the mathematical expressions 5 and 12 discussed in Patent Document 1, for example. That is, the sensitivity estimation method involving the use of the technique described in Patent Document 1 requires running as many sets of Monte Carlo simulations as the number of the numerous parameters involved.

Obtaining the expected value for the index of interest by running a set of Monte Carlo simulations requires running a sufficiently large number of simulations to satisfy the law of large numbers in the first place. It is thus difficult to run as many sets of Monte Carlo simulations as the number of the many parameters due to constraints on available computing resources and computing time.

Means for Solving the Problems

In solving the problem above and according to a typical embodiment of the present invention, there is provided a simulation system for repeating a simulation of a stochastic system that inputs each of a plurality of random number vectors to calculate a plurality of realized values of the behavior of the stochastic system. The simulation system includes a processor and a memory. The memory holds: a behavior function configured to determine the realized values of the behavior of the stochastic system based on a random number vector made up of at least one random number and on a parameter vector made up of at least one parameter; a behavior evaluation function configured to determine a behavior evaluation value of the stochastic system based on the realized values of the behavior of the stochastic system; and a weight function configured such that under the condition of keeping constant the realized values of the behavior function corresponding to a random number vector, the weight function determines a first differential coefficient with each of the parameters in the random number vector, the weight function further determining the weight of the random number vector for the parameter of interest based on the first differential coefficient. The processor obtains a plurality of random number vectors and a parameter vector. Based on each of the random number vectors, on the obtained parameter vector, and on the behavior function, the processor calculates the realized values of the behavior of the stochastic system corresponding to each of the obtained random number vectors. Based on each of the obtained random number vectors, on the obtained parameter vector, and on the weight function, the processor also calculates the weight of each of the obtained random number vectors with regard to each of the parameters in the obtained parameter vector. Based on each of the calculated realized values and on the behavior evaluation function, the processor further calculates the behavior evaluation value of the stochastic system corresponding to each of the obtained random number vectors. Based on the calculated behavior evaluation value corresponding to each of the obtained random number vectors and on the weight of each of the obtained random number vectors with regard to the parameter selected from the obtained parameter vector, the processor further calculates the sensitivity of an expected value for the behavior evaluation value of the stochastic system with regard to the selected parameter.

Effect of the Invention

According to the above-outlined embodiment of the present invention, given a stochastic system that has parameters, it is possible to obtain the sensitivity of the expected value for any index of interest with regard to each parameter from the result of a single set of Monte Carlo simulations. This reduces the computing resources and computing time required to obtain the sensitivity of the expected value for the index of interest with regard to the parameters involved.

BRIEF DESCRIPTION OF THE DRAWINGS

FIG. 8 is a tabular view showing a typical income and expenditure plan for a bank as a third embodiment.

MODES FOR CARRYING OUT THE INVENTION

Figure 1:
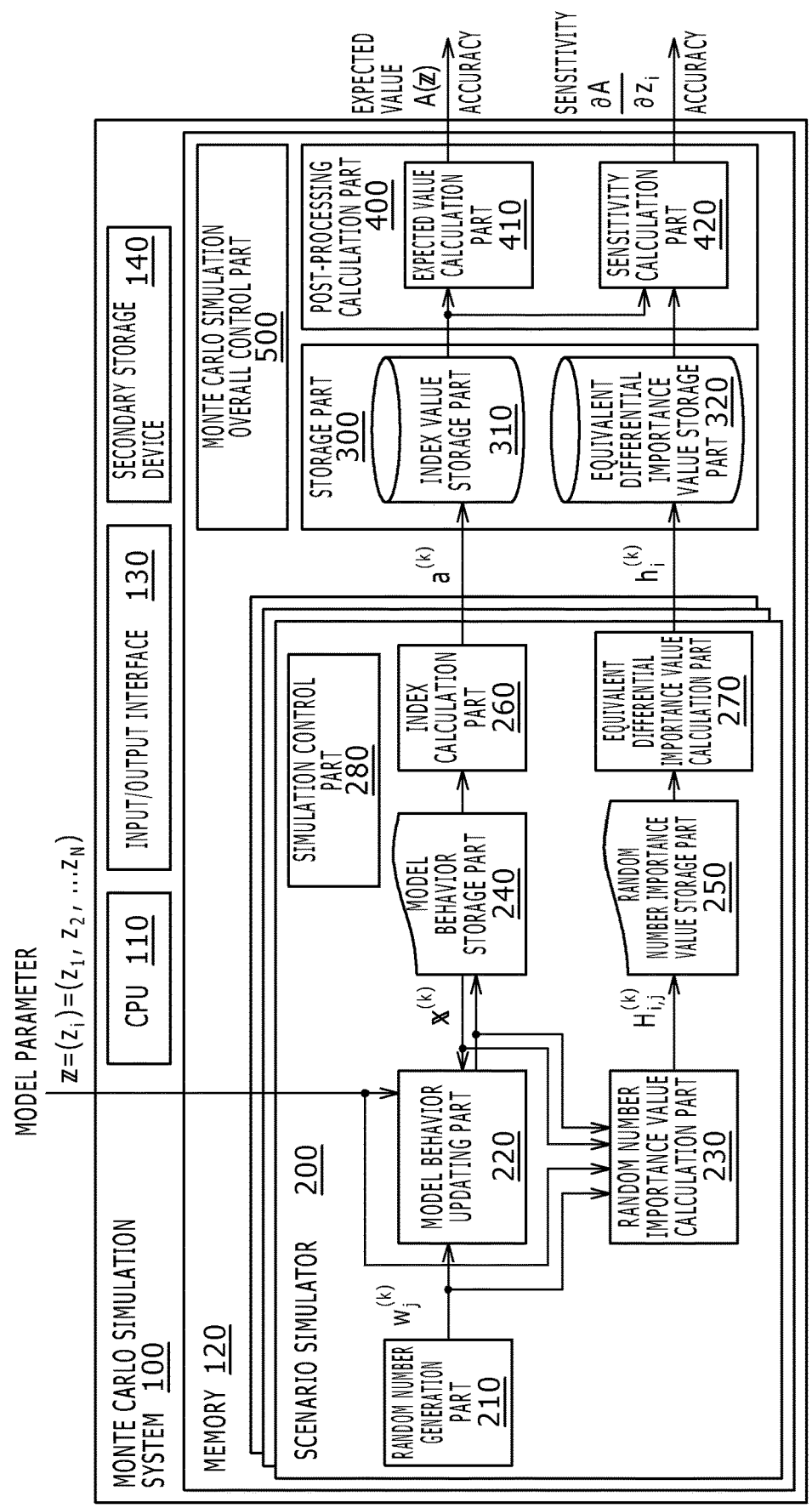
FIG. 1 is a block diagram showing a typical configuration of a Monte Carlo simulation system as a first embodiment.

Some preferred embodiments of the present invention are described below. It should be noted that the embodiments are merely examples of how the present invention may be implemented and that they are not limitative of the technical range of the invention. In the ensuing description of each preferred embodiment of the present invention, the embodiment may be explained in a plurality of sections or examples as needed. These sections or examples are not unrelated to each other but are variable of, explanatory of, or complementary to each other unless specified otherwise. In the description below of each preferred embodiment, references to the numerical aspects of the composing elements making up the embodiment (including quantities, values, amounts, and ranges) denote not definitive numbers but merely examples and are not limitative of the embodiment unless specified otherwise or unless the numbers are obviously determined theoretically.

The preferred embodiments of the present invention will now be described with reference to the accompanying drawings. Throughout the drawings, like reference characters are used generally to indicate like parts, components and structures, and redundant explanations are omitted.

First Embodiment

A first embodiment to be explained below concerns a Monte Carlo simulation system. Described first are the theoretical aspects of the Monte Carlo simulation system of the first embodiment running simulations for sensitivity calculation.

A stochastic variable X represents the behavior of a stochastic system targeted for simulation by the Monte Carlo simulation system of the first embodiment. That is, the behavior of the stochastic system targeted for the simulation is modeled using the stochastic variable X. In the ensuing description, the stochastic system subject to simulation may be simply referred to as the system. Reference character x denotes a realized value of the behavior X of the system.

Here, the system behavior X may be either a one-dimensional vector or a multi-dimensional vector. The behavior X may also be a set of an infinite number of stochastic variables distinguished from one another by a variable t called "time" (also called a discrete-time stochastic process). Normally, when the system behavior X is a discrete-time stochastic process, X is written as X(t). Still, the behavior may be simply written as X unless specifically required otherwise. A value $x(t_1)$ indicative of the system behavior at a given time $t_1$ is called the system state at the time $t_1$.

The distribution of the system behavior X is assumed to be dependent on a parameter z of the system. The probability density function of X is assumed to be written as f(x, z). In the ensuing description, the system parameter z will be simply written as the parameter z. The parameter z is assumed to be an N-dimensional vector (i.e., the system behavior is dependent on N parameters), and the component of z is assumed to be $z=(z_i)$ (where, i=1, . . . , N). A given function a(x) is assumed in which one real number is defined for the realized value X=x of the behavior of one system. The function a(x) is called the system behavior evaluation function. The system behavior evaluation function is a typical index of interest. Also, the expected value of a(x) written as A(x)=E[a(x)] is called the system evaluation function.

When an actual system of interest is examined, the unknown probability density function f(x, z) of X often becomes a problem. In many cases, however, the behavior that generates the distribution of X is known (or susceptible to being modeled) even though the probability density function f(x, z) of X is unknown.

In such cases, the Monte Carlo simulation system runs Monte Carlo simulations to generate numerous realized values x of the system behavior. The value of the system evaluation function A(x) is then approximated by simulating the distribution of X, i.e., f(x, z). Each of the generated realized values x of the system behavior is also called a path. The Monte Carlo simulation includes performing calculations to obtain the realized values x of the system behavior from (multiple) random numbers of which the distribution is known. The processing above is formulated as explained below.

$W=(W_j)$ is assumed to be an M-dimensional stochastic variable (where j=1, ..., M), and the realized value of the stochastic variable W is written as $w=(w_j)$. The (simultaneous) probability density function of W is written as g(w). It is assumed here that g(w) is known and that the random numbers following this distribution are easily generated by computer. Reference character w represents a vector made up of M independent random numbers following the uniform distribution on [0, 1] or the standard normal distribution N(0, 1), for example. It is assumed here that under the parameter $z=(z_j)$, a method is given to calculate the realized value x of the corresponding variable X from the random number vector w, i.e., a function x=(w, z). In this case, the following mathematical expression 1 holds:

$A(z)=E[a(X)]=\int a(x)f(x,z)dx=$
$\int_\Omega a(x(w,z))g(w)dw$•  Mathematical Expression 1

In the expression above, Ω denotes the distribution range of the random number vector w, i.e., the support for g(w). Reference character dw in the rightmost side is an abbreviation of $dw_1 \cdot dw_2 \cdot \ldots \cdot dw_M$. The integral sign denotes M-dimensional multiple integral. Simulating one path in a Monte Carlo simulation is equivalent to calculating the function x=x(w, z).

Where Monte Carlo simulations are run on L paths, L random number vectors are generated. If each of the generated L random number vectors is written as $w^k=(w_j^k)$ (where j=1, ..., M; k=1, ..., L; L is a number satisfying the law of large numbers), then the system evaluation function is calculated in accordance with the law of large numbers by approximating the expected value using an average of numerous (L) samples $x(w^k, z)$, such as by using the following mathematical expression 2:

$$A(z) = E[a(X)] = \int_\Omega a(x(w,z))g(w)dw \cong \frac{1}{L}\sum_{k=1}^{L} a(x(w^k, z)).$$

Mathematical Expression 2

One object of the first embodiment is to provide a method, as given by the mathematical expression 3 shown below, for efficiently calculating a differential coefficient by differentiating the system evaluation function by each of N parameters ($z_i$). This differential coefficient is called the sensitivity of the system evaluation function with regard to the parameters.

$$\frac{\partial A(z)}{\partial z} = \left(\frac{\partial A(z)}{\partial z_i}\right)_{i=1 \ldots N}$$

Mathematical Expression 3

A basic idea of the first embodiment is described below. The basic idea is to use continuously the system behavior (realized value) x generated under a given parameter set z after the parameters $z_i$ have been infinitesimally changed. In many systems, the function x(w, z) is continuous. With that given, consider the case where an infinitesimal change $\Delta z_i$ smaller than a predetermined threshold value of the parameter is matched with a canceling infinitesimal change $\Delta w$ smaller than a predetermined threshold of a random number vector, i.e., the case where a given change $\Delta z_i$ is matched with a change $\Delta w$ that satisfies the following mathematical expression 4:

$x=x(w,z)=x(w+\Delta w, z+\Delta z_i)$•  Mathematical Expression 4

In the case above, the distribution of $w+\Delta w$ does not follow the probability density function g(w). That means $A(z+\Delta z_i)$ cannot be calculated by a simple average as given by the mathematical expression 2. However, the basic idea of the first embodiment is to calculate $A(z+\Delta z_i)$ by first considering how much the distribution of $w+\Delta w$ differs from the function g(w) so as to suitably weight each a(x(w, z)), before calculating their average to obtain $A(z+\Delta z_i)$. The method of the first embodiment may be thought to be an example of importance sampling method. The weight here corresponds to the importance value.

Specifically, the mathematical expression 5 below is used to calculate a relationship between $\Delta z_i$ and $\Delta w$ that keeps x constant with regard to each path x. The weight is calculated on the basis of the relationship thus calculated.

$$\left.\frac{\partial w}{\partial z_i}\right|_{x=const} = -\frac{\frac{\partial x}{\partial z_i}}{\frac{\partial x}{\partial w}}$$

Mathematical Expression 5

The mathematical expression 5 above signifies that each of the terms constituting a vector $(\partial w/\partial z_i)|_{x=const}$ represented by the right side. However, this notation is merely a formal one because x can be an infinite dimensional variable. This point will be discussed later.

For many actual systems targeted for Monte Carlo simulations, the constructive algorithm for calculating x from w, z is known, i.e., a specific form of the function x=x(w, z) is known. In this case, users can analytically calculate a specific form of the function (of w and z) indicated by the right side of the mathematical expression 5. Thus $(\partial w/\partial z_i)|_{(x=const)}$ is calculated by substituting a random number vector and a parameter into the function thus calculated analytically, for example. Even where a specific form of the function indicated by the right side of the mathematical expression 5 cannot be analytically calculated because the specific form of the function x(w, z) is unknown, $(\partial w/\partial z_i)|_{x=const}=\Delta w/\Delta z_i$ can be approximated by obtaining $\Delta w$ that keeps x constant with regard to the infinitesimal change $\Delta z_i$ of the parameter.

The above-described idea is formulated in specific terms below. When the parameter is given as $z+\Delta z_i=(z_1, z_2, \ldots, z_i+\Delta z_i, \ldots, z_N)$ in which $\Delta z_i$ is the infinitesimal change of the i-th parameter, the system evaluation function $A(z+\Delta z_i)$ is defined by the following mathematical expression 6:

$$A(z + \Delta z_i) = \int_\Omega a(x(w, z + \Delta z_i)) g(w) dw$$

$$= \int_{\Omega'} a(x(w' + \Delta w, z + \Delta z_i)) \frac{g(w' + \Delta w)}{\left|\frac{dw'}{dw}\right|} dw' \quad \text{substituting } w \to w' + \Delta w$$

$$= \int_{\Omega'} a(x) \frac{g(w + \Delta w)}{\left|I - \frac{d\Delta w}{dw}\right|} dw \qquad \frac{dw'}{dw} = I - \frac{d\Delta w}{dw}$$

$$= \int_{\Omega'} a(x) \frac{g(w + \Delta w)}{\left|I - \frac{d}{dw}\left(\frac{\partial w}{\partial z_i}\Big|_{x=const}\right)\Delta z_i\right|} dw \qquad \frac{d\Delta w}{dw} = \frac{d}{dw}\left(\frac{\partial w}{\partial z_i}\Delta z_i\right) = \frac{d}{dw}\left(\frac{\partial w}{\partial z_i}\right)\Delta z_i$$

$$\cong \int_{\Omega'} a(x)\left\{g(w) + \frac{\partial g}{\partial w} \cdot \left[\left(\frac{\partial w}{\partial z_i}\Big|_{x=const}\right)\Delta z_i\right]\right\}$$

$$\left\{1 + tr\left[\frac{d}{dw}\left(\frac{\partial w}{\partial z_i}\Big|_{x=const}\right)\Delta z_i\right]\right\} dw.$$

In the expression above, $(\partial w/\partial z_i)|_{x=const}$ represents the relationship between the infinitesimal change $\Delta z_i$ of the parameter and the infinitesimal change $\Delta w$ of the random number vector, the relationship being such as to satisfy $x=x(w, z)=x(w+\Delta w, z+\Delta z_i)$, as discussed above. Character I stands for an identity matrix, tr for a matrix trace, and the middle dot • for an inner product. Further, $|dw'/dw|$ denotes a Jacobian determinant derived from the change of variables from w to w', and $\Omega'$ represents a figure of $\Omega$ stemming from the change of variables. Thus the following mathematical expression 7 holds:

$$\frac{\partial A}{\partial z_i} = \lim_{\Delta z_i \to 0} \frac{A(z + \Delta z_i) - A(z)}{\Delta z_i} \qquad \text{Mathematical Expression 7}$$

$$= \int_\Omega a(x) \sum_{j=1}^{M} \left[\frac{\partial}{\partial w_j}\left(\frac{\partial w_j}{\partial z_i}\Big|_{x=const}\right)\right.$$

$$\left. g(w) + \frac{\partial g}{\partial w_j}\left(\frac{\partial w_j}{\partial z_i}\Big|_{x=const}\right)\right] dw - R_i$$

$$= \int_\Omega a(x) \sum_{j=1}^{M} \left\{\begin{array}{c} \frac{\partial}{\partial w_i}\left(\frac{\partial w_i}{\partial z_i}\Big|_{x=const}\right) + \\ \frac{1}{g(w)} \frac{\partial g}{\partial w_i} \\ \left(\frac{\partial w_i}{\partial z_i}\Big|_{x=const}\right) \end{array}\right\}$$

$$g(w) dw - R_i$$

$$= \int_\Omega a(x) h_i(w, z) g(w) dw - R_i$$

$$= E[a(X) h_i(W, z)] - R_i.$$

It is assumed here that there is an integral of the mathematical expression 7. An N variable function $h(w, z)=(h_i(w, z))$ (where $i=1, \ldots, N$) defined by the mathematical expression 8 below is called the equivalent differential importance value.

$$h_i(w, z) = \sum_{j=1}^{M} \left[\frac{\partial}{\partial w_j}\left(\frac{\partial w_j}{\partial z_i}\Big|_{x=const}\right) + \right. \qquad \text{Mathematical Expression 8}$$

-continued $$\left. \frac{1}{g(w)} \frac{\partial g}{\partial w_j}\left(\frac{\partial w_j}{\partial z_i}\Big|_{x=const}\right)\right]$$

Given the mathematical expression 7, the differential coefficient, i.e., the sensitivity, of the system evaluation function with regard to the parameter is calculated on the basis of the expected value for the system behavior evaluation value weighted by the equivalent differential importance value. Reference character $R_i$ in the mathematical expression 7 denotes a member added to or subtracted from the side following replacement of the integral range $\Omega'$ of the mathematical expression 7 with $\Omega$. This gives the following mathematical expression 9:

$$R_i = \int_{\partial\Omega} a(x) g(w) \left(\frac{\partial w}{\partial z_i}\Big|_{x=const}\right) \cdot n dw \qquad \text{Mathematical Expression 9}$$

$$= \int_\Omega div\left[a(x) g(w) \left(\frac{\partial w}{\partial z_i}\Big|_{x=const}\right)\right]$$

$dw$(divergence theorem)

$$= \int_\Omega \left\{\frac{1}{g(w)} div\right.$$

$$\left.\left[a(x) g(w) \left(\frac{\partial w}{\partial z_i}\Big|_{x=const}\right)\right]\right\} g(w) dw.$$

The member $R_i$ is called the boundary residual, whereas $\partial\Omega$ stands for the boundary (surface) of $\Omega$ and n for the outward unit normal vector of the boundary $\partial\Omega$. As seen in the mathematical expression 9, if $(\partial w/\partial z_i)|_{x=const}=0$ (vector) over the boundary (surface) $\partial\Omega$ of $\Omega$, then $R_i=0$. In this case, the following mathematical expression 10 holds based on the mathematical expression 7:

$$\frac{\partial A}{\partial z_i} = \qquad \text{Mathematical Expression 10}$$

$$\int_\Omega a(x) h_i(w, z) g(w) dw = E[a(X) h_i(W, z)].$$

What follows is a description of the equivalent differential importance value $h_i(w, z)$ regarding the distribution of a representative random number vector w. If the vector w is a uniformly distributed random number vector, then $h_i(w, z)$ is defined by the following mathematical expression 11:

$$h_i(w, z) = \sum_{j=1}^{M} \frac{\partial}{\partial w_j}\left(\left.\frac{\partial w_j}{\partial z_i}\right|_{x=const}\right).$$

Mathematical Expression 11

If the vector w is a random number vector of M-dimensional independent standard normal distribution, $h_i(w, z)$ is defined by the following mathematical expression 12:

$$h_i(w, z) = \sum_{j=1}^{M} \left[\frac{\partial}{\partial w_j}\left(\left.\frac{\partial w_j}{\partial z_i}\right|_{x=const}\right) - w_j\left(\left.\frac{\partial w_j}{\partial z_i}\right|_{x=const}\right)\right].$$

Mathematical Expression 12

The differential coefficient of the system evaluation function $A(z)$, found in the mathematical expression 7, with regard to the parameter z is approximated by running Monte Carlo simulations, such as by using the following mathematical expression 13:

$$\frac{\partial A}{\partial z_i} = E[a(X)h_i(W, z)] - R_i \cong \frac{1}{L}\sum_{k=1}^{L} a(x(w^k, z))h_i(w^k, z) - R_i.$$

Mathematical Expression 13

In particular, if $(\partial w/\partial z_i)|_{x=const}=0$ over the boundary (surface) $\partial\Omega$ of $\Omega$, then the following mathematical expression 14 defines the sensitivity of the system evaluation function $A(z)$ with regard to the parameter z given the mathematical expression 10.

$$\frac{\partial A}{\partial z_i} = E[a(X)h_i(W, z)] \cong \frac{1}{L}\sum_{k=1}^{L} a(x(w^k, z))h_i(w^k, z)$$

Mathematical Expression 14

The mathematical expressions 2, 13 and 14 may be used to run a single set of Monte Carlo simulations only with respect to the initial parameter z to calculate L paths $\{x(w^k, z)\}$ and the equivalent differential importance value $\{h(w^k, z)\}$ on each of the L paths (where k=1, . . . , L). The calculations make it possible simultaneously to obtain both the system evaluation function $A(z)$ with regard to the parameter z and the differential coefficient of the system evaluation function $A(z)$ with regard to all parameters. That is, the Monte Carlo simulation system of the first embodiment has no need to run Monte Carlo simulations on each parameter $z+\Delta Z_i$ following the infinitesimal changes.

Given the mathematical expressions 2 and 14, it will be appreciated that the system behavior evaluation function $a(x)$ may be set as desired upon completion of Monte Carlo simulations. This feature is advantageous because, for example, it is often the case that with a complex system targeted for simulation, the object to be evaluated and the phenomenon to be focused on become known only after the system behavior has been actually simulated.

The mathematical expressions 13 and 14 are formulated for ordinary expected value calculations. Thus the dispersion of the estimated values of the differential coefficient stemming from L simulations decreases at a rate of $O(L^{-1})$. On the other hand, if a Monte Carlo simulation is simply repeated as many times as the number of parameters, the dispersion of the estimated values of the differential coefficient decreases only at a rate of $O(L^{-1/4})$ or $O(L^{-1/3})$ relative to the simulation count. That is, the convergence of the dispersed estimated values of the differential coefficient increases with the simulations run by the first embodiment.

The boundary residual $R_i$ defined by the mathematical expression 9 occurs when the distribution range of $w+\Delta w$ such as to satisfy $x(w, z)=x(w+\Delta w, z+\Delta z_i)$ deviates from the distribution range $\Omega$ of w (i.e., domain of the probability density function followed by w). That is, suppose that the realized value $w+\Delta w$ of a random number vector that will cancel out the infinitesimal change $\Delta z_i$ of the parameter exists for the realized values $w \in \Omega$ of all random number vectors that may appear. In that case, if the distribution range of $w+\Delta w$ written as $\Omega'=\{w+\Delta w; w\in\Omega\}$ coincides with $\Omega$, then the boundary residual $R_i$ does not occur.

If it is assumed that an actual system is targeted for Monte Carlo simulation and that the parameter $z_i$ is infinitesimally changed, there often exists a noise (realized value of a random number vector) that cancels out the change with regard to any behavior x of the system. In such a case, the boundary residual $R_i$ does not occur. Where the distribution range $\Omega$ of w covers all real numbers as in the case of a random number vector that follows normal distribution, the range $\Omega$ has no boundary, so that the boundary residual $R_i$ is zero.

In that case, the Monte Carlo simulation system has no need to calculate the boundary residual $R_i$ and can cut down on computing time and computing resources. In the ensuing description, it is assumed that the distribution range $\Omega$ of the random number vector w satisfies $\Omega=\Omega'$, i.e., that the boundary residual $R_i$ is zero unless otherwise specified.

Below is an explanation of typical conditions under which the sensitivity calculation method of the first embodiment is usable. It has been explained above that the basic idea of this embodiment involves assuming $\Delta w$ that keeps x constant with regard to the infinitesimal change $\Delta z_i$ of the parameter. In practice, however, there may or may not exist $\Delta w$ satisfying the mathematical expression 4 given the infinitesimal change $\Delta z_i$.

As mentioned above, x can be an infinite dimensional vector. That is, the dimension of x can be larger than the dimension M of w. In this case, the number of constraint conditions in the mathematical expression 4 is larger than the number of variables $\Delta w$ (number of dimensions). That means the number $\Delta w$ satisfying the mathematical expression 4 usually does not exist. That is, the method of the first embodiment is not usable if there is no infinitesimal change $\Delta w$ of a random number vector satisfying the mathematical expression 4 with regard to a given infinitesimal change $\Delta z_i$ of the parameter.

Explained below is an example in which the method of the first embodiment is usable, i.e., an example in which there exists the infinitesimal change $\Delta w$ of the random number vector satisfying the mathematical expression 4 with regard to the infinitesimal change $\Delta z_i$ of the parameter.

If the time series x(t) indicative of the system behavior is defined by the following mathematical expression 15, for example, the method of the first embodiment is usable:

$$x(t)=f(t,y(w,z))\bullet \quad \text{Mathmatical Expression 15}$$

The mathematical expression 15 indicates that if the random number vector w and the parameter z determine a value y(w, z), then the system state x(t) at a time t is determined by the time t and the value y. In this case, the following mathematical expression 16 obviously holds:

$$\left.\frac{\partial w}{\partial z}\right|_{x(t)=const} = \left.\frac{\partial w}{\partial z}\right|_{y=const}. \quad \text{Mathematical Expression 16}$$

Also, if the time series x(t) indicative of the system behavior is described by a recurrence formula such as the following mathematical expression 17 for example, the method of the first embodiment is usable:

$$x(t+1)=f(t,x(0),x(1),\ldots,x(t-1),x(t),W_j,z)\bullet \text{Mathmatical Expression 17}$$

The mathematical expression 17 indicates that the system state x(t+1) at a time t+1 is determined by a time t, by the system behavior in the past (before time t), by a random number $w_j$ generated anew at the time t and varying at each time (where $w_j$ may be a random number vector including multiple random numbers), and by a parameter z. In this case, the following mathematical expression 18 holds:

$$f(t,x(0),\ldots,x(t-1),x(t),W^{(t)},z)=f(t,x(0),\ldots,x(t-1),$$
$$W_j+\Delta W_j,z+\Delta z)\bullet \quad \text{Mathmatical Expression 18}$$

The mathematical expression 18 indicates that the infinitesimal change $\Delta w_j$ of the random number that cancels out the infinitesimal change $\Delta z_i$ of the parameter is determined successively from an initial time t=0 up to a simulation end time t=T.

Described below are the practical aspects of the Monte Carlo simulation system of the first embodiment running simulations to calculate sensitivity. FIG. 1 shows a typical configuration of a Monte Carlo simulation system 100 of the first embodiment. The Monte Carlo simulation system 100 is implemented on a computer that includes a CPU 110, a memory 120, an input/output interface 130, and a secondary storage device 140, for example. Although the Monte Carlo simulation system 100 in FIG. 1 is constituted from a single computer, the system may be constituted alternatively from multiple computers.

The CPU 110 includes a processor and/or a logic circuit operating according to programs. As such, the CPU 110 inputs and outputs data, performs read and write operations, and executes various programs that will be discussed later. The memory 120 is temporarily loaded with and stores programs and data to be executed and operated on by the CPU 110, and further holds the programs and data. The input/output interface 130 outputs and inputs data and other resources to and from an external device, for example. The secondary storage device 140 is a nonvolatile storage device such as a hard disk drive (HDD). The programs and data may also be stored in the secondary storage device 140.

Programs are executed by the CPU 110 to perform predetermined processes using the memory 120 and the input/output interface 130. Thus in the ensuing description, the wording of some program performing some process may be replaced with the wording of the CPU 110 carrying out that process. In other words, the process performed by a program is a process executed by the computer and computing system on which the program runs.

By operating in accordance with a program, the CPU 110 works as a functional part that implements a predetermined function. For example, when operating in accordance with a random number generation part 210, which is a program to be discussed later, the CPU 110 functions as a random number generation part; when operating in accordance with a model behavior updating part 220, another program to be discussed later, the CPU 110 functions as a model behavior updating part. The CPU 110 also works as a functional part that performs each of multiple processes executed by multiple programs. The computer and the computing system are each a system that includes these functional parts. The programs may also be stored in the secondary storage device 140.

The memory 120 includes one or multiple scenario simulators 200, a storage part 300, a post-processing calculation part 400, and a Monte Carlo simulation overall control part 500. The scenario simulator 200 runs L Monte Carlo simulations using different random number vectors. The storage part 300 stores values and other data output from the scenario simulator 200. The post-processing calculation part 400 calculates expected values and sensitivity levels at the end of the simulations.

The Monte Carlo simulation overall control part 500 provides overall control of the Monte Carlo simulation system 100. The Monte Carlo simulation overall control part 500 may calculate and output the calculation accuracy of the system evaluation function and of the estimated sensitivity value calculated by the simulations of which the number is designated typically by the user. The Monte Carlo simulation overall control part 500 may further calculate and output the simulation count necessary for guaranteeing the calculation accuracy of the system evaluation function and of the estimated sensitivity value designated typically by the user. For example, the Monte Carlo simulation overall control part 500 starts the scenario simulator 200 as many times as the designated or calculated number of simulations such as L. At the end of the L simulations, the Monte Carlo simulation overall control part 500 starts the post-processing calculation part 400.

The scenario simulator 200 inputs a one-dimensional or multi-dimensional parameter vector z of the simulation model given typically by the user, and runs simulations on the model while internally generating a random number vector necessary for the simulations. Also, the scenario simulator 200 outputs a system behavior evaluation function $a^{(k)}$ and an equivalent differential importance value $h_i^{(k)}$ necessary for sensitivity calculation.

The scenario simulator 200 includes a random number generation part 210, a model behavior updating part 220, a random number importance value calculation part 230, an index calculation part 260, an equivalent differential importance value calculation part 270, and a simulation control part 280, each being a program. The scenario simulator 200 further includes a model behavior storage part 240 and a random number importance value storage part 250, each being a data storage area.

The random number generation part 210 generates a random number vector that follows a probability density function corresponding to the simulation model determined beforehand or designated typically by the user. The model behavior updating part 220 inputs the parameters given typically by the user and the random number vector generated by the random number generation part 210, and applies the input parameters and random number vector to the simulation model (function) determined beforehand or designated typically by the user so as to simulate the realized values of the system behavior.

The random number importance value calculation part 230 inputs parameters and the random number vector generated by the random number generation part 210, and calculates the random number importance value for each parameter $w_j^{(k)}$ out of the input parameters, i.e., calculates the terms in the summation sign of the mathematical expression 8. The model behavior storage part 240 stores the realized values of the system behavior calculated by the model behavior updating part 220. The random number importance value storage part 250 stores the random number importance values calculated by the random number importance value calculation part 230. The index calculation part 260 calculates the evaluation function of the system behavior by, for example, obtaining an average of the system behavior realized values stored in the model behavior storage part 240.

The equivalent differential importance value calculation part 270 calculates the equivalent differential importance value by, for example, obtaining the sum of random number importance values stored in the random number importance value storage part 250. The simulation control part 280 controls the overall operation of the scenario simulator 200.

The storage part 300 includes an index value storage part 310 that stores the system behavior evaluation function $a^{(k)}$ calculated by the index calculation part 260, and an equivalent differential importance value storage part 320 that stores the equivalent differential importance value calculated by the equivalent differential importance value calculation part 270.

The post-processing calculation part 400 includes an expected value calculation part 410 and a sensitivity calculation part 420, each being a program. The expected value calculation part 410 calculates an average of L system behavior evaluation functions $a^{(k)}$ stored in the index value storage part 310, and outputs the calculated average as the expected value, i.e., as the system evaluation function $A(z)$. In this case, the expected value calculation part 410 may further calculate the dispersion of the L system behavior evaluation functions $a(k)$ and output simultaneously the accuracy (confidence interval) of the expected value of $A(z)$.

The sensitivity calculation part 420 calculates the product of each of the system behavior evaluation functions $a^{(k)}$ stored in the index value storage part 310 and the corresponding equivalent differential importance value $h_i^{(k)}$ with regard to each of N parameters stored in the equivalent differential importance value storage part 320. The sensitivity calculation part 420 further calculates an average of the calculated products and outputs the calculated average as the sensitivity $\partial A/\partial z_i$ of the system evaluation function $A(z)$ regarding each of the N parameters. In this case, the sensitivity calculation part 420 may further calculate the dispersion of the products of $a^{(k)}$ and $h_i^{(k)}$ and output simultaneously the accuracy (confidence interval) of the expected value for the sensitivity $\partial A/\partial z_i$.

Figure 2:
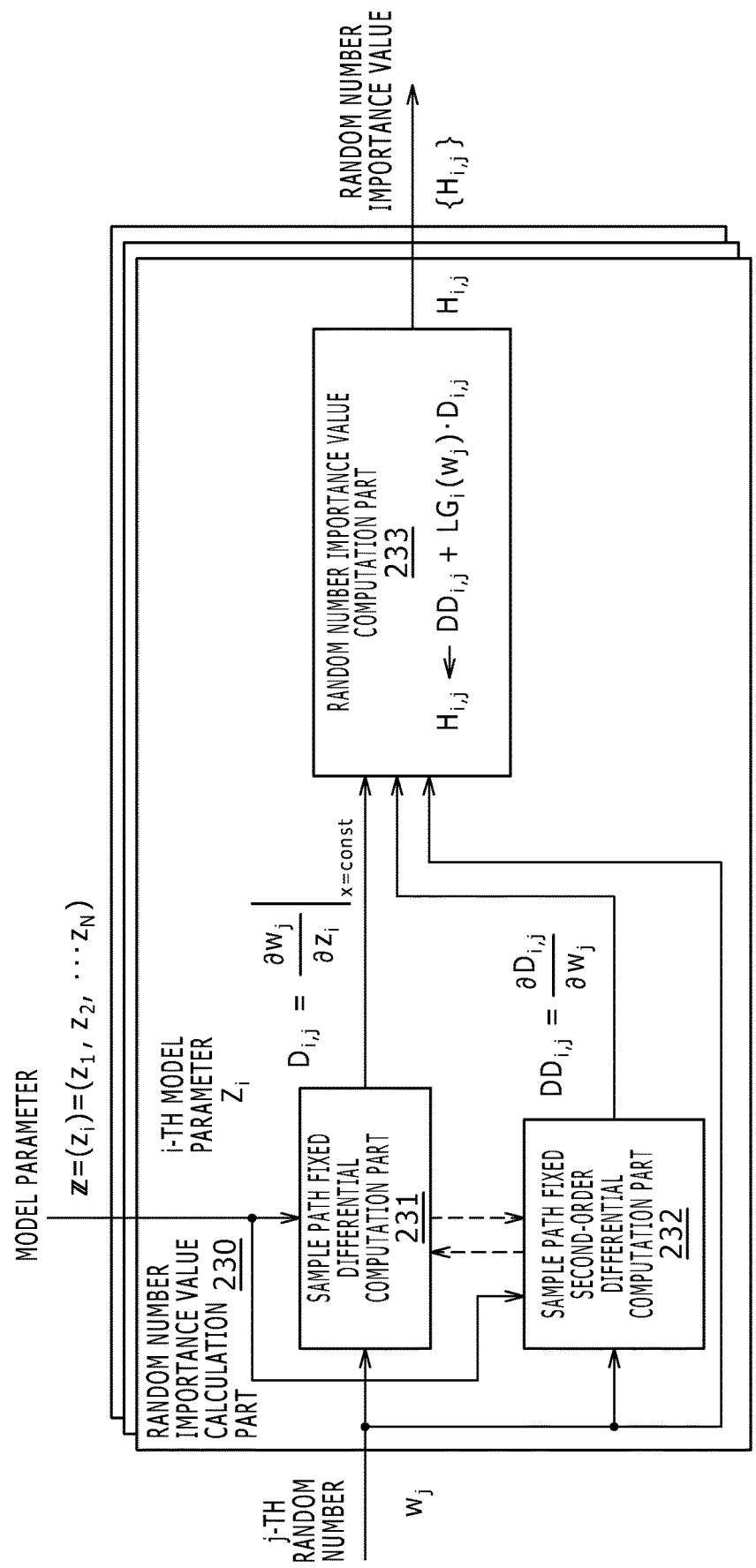
FIG. 2 is a block diagram showing a typical configuration of a random number importance value calculation part in the first embodiment.

FIG. 2 shows a typical configuration of the random number importance value calculation part 230. The random number importance value calculation part 230 includes a sample path fixed differential computation part 231, a sample path fixed second-order differential computation part 232, and a random number importance value computation part 233, each being a program.

The sample path fixed differential computation part 231 inputs parameters and the random number vector generated by the random number generation part 210, and calculates $(\partial w_j/\partial z_i)|_{x=const}$. The sample path fixed second-order differential computation part 232 inputs parameters and the random number vector generated by the random number generation part 210, and calculates $\partial D_{i,j}/\partial w_j (D_{i,j}^{(k)}=(\partial w/\partial z_i)|_{x=const})$. The sample path fixed second-order differential computation part 232 may input parameters and $(\partial w_j/\partial z_i)|_{x=const}$ calculated by the sample path fixed differential computation part 231 and calculate $\partial D_{i,j}/\partial w_j$. Alternatively, the sample path fixed second-order differential computation part 232 may calculate $(\partial w_j/\partial z_i)|_{x=const}$. In this case, the sample path fixed differential computation part 231 need not calculate $(\partial w_j/\partial z_i)|_{x=const}$.

The random number importance value computation part 233 inputs the random number vector from the random number generation part 210, $(\partial w_j/\partial z_i)|_{x=const}$ calculated by the sample path fixed differential computation part 231 or by the sample path fixed second-order differential computation part 232, and $\partial D_{i,j}/\partial w_j$ calculated by the sample path fixed second-order differential computation part 232, and calculates the random number importance value regarding each parameter $w_j^{(k)}$ out of the parameters involved, i.e., calculates the terms in the summation sign of the mathematical expression 8.

Figure 3:
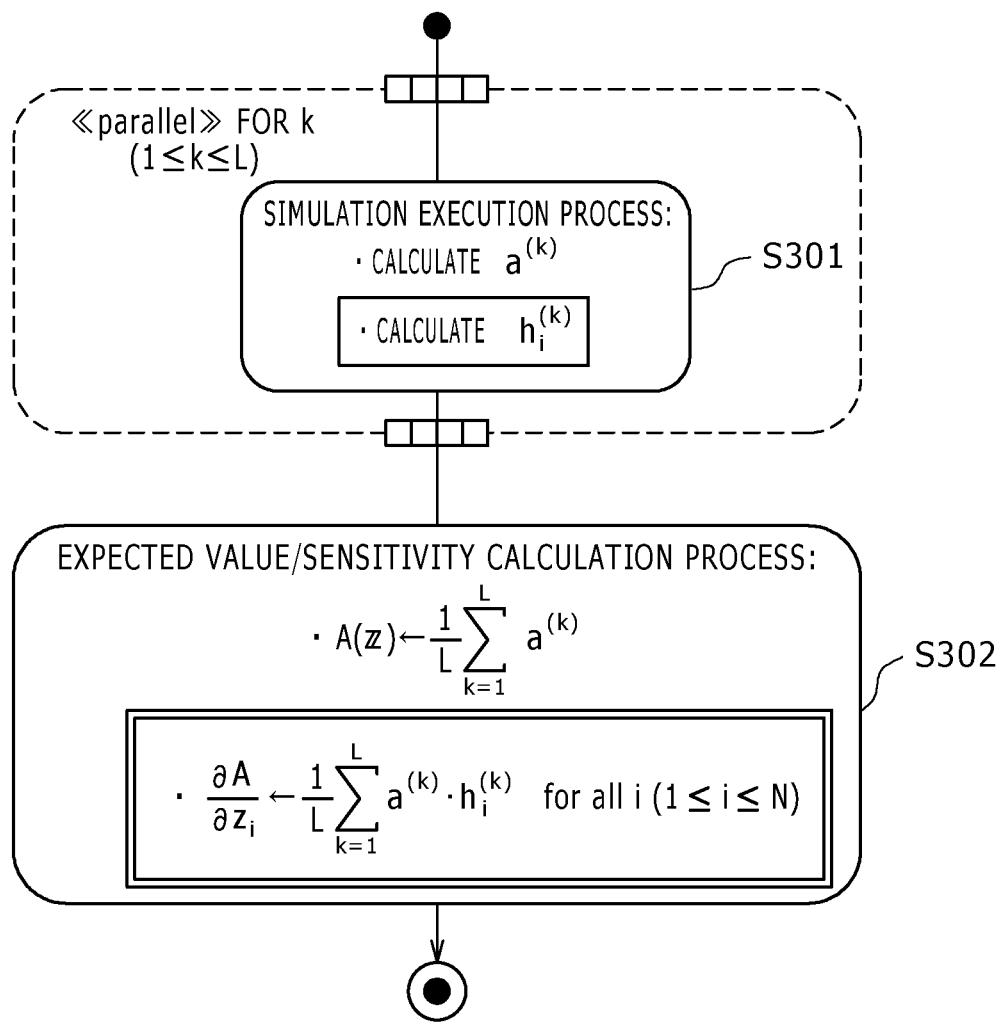
FIG. 3 is a flowchart showing overall processing of Monte Carlo simulations run by the first embodiment.

FIG. 3 shows typical overall processing of Monte Carlo simulations run by the first embodiment. The overall processing of the Monte Carlo simulation includes a simulation execution process in which the scenario simulator 200 runs L simulations using different random number vectors, and an expected value/sensitivity calculation process performed by the post-processing calculation part 400 at the end of the simulations.

The scenario simulator 200 performs the simulation execution process (S301). The simulation execution process involves running L simulations constituting a single set of Monte Carlo simulations. The scenario simulator 200 runs the individual simulations using different random number vectors.

From the system behavior realized value $x^{(k)}$ obtained by the k-th simulation, the Monte Carlo simulation system of the first embodiment calculates the equivalent differential importance value $h_i^{(k)}$ for each of N parameters in addition to the system behavior evaluation function $a^{(k)}$. Because the L simulations in the simulation execution process are independent of each other, these simulations may be run not successively but parallelly using numerous scenario simulators 200 or computers. A series of functions defining the process of calculating the equivalent differential importance value $h_i^{(k)}$ are called the weight function.

The post-processing calculation part 400 proceeds to perform the expected value/sensitivity calculation process (S302). The expected value/sensitivity calculation process is a process in which following execution of the L simulations constituting a single set of Monte Carlo simulations, the post-processing calculation part 400 calculates an estimated value of the expected value for the index of interest and an estimated value of the sensitivity for the parameters of the expected value for the index of interest.

The expected value for the index of interest, i.e., the estimated value of the system evaluation function $A(z)$, is obtained by the expected value calculation part 410 calculating an average of the L system behavior evaluation functions $a^{(k)}$ stored in the index value storage part. In addition to obtaining the average, the Monte Carlo simulation system of the first embodiment calculates the estimated value of the sensitivity for each of the N parameters of the expected value for the index of interest.

Specifically, the sensitivity calculation part 420 obtains the estimated value of the sensitivity for each of the i-th parameters of the system evaluation function A(z) by calculating an average of the estimated values of the corresponding system behavior evaluation function $a^{(k)}$ in the index value storage part 310 weighted through multiplication by the equivalent differential importance value $h_i(k)$ for the i-th parameter in the equivalent differential importance value storage part 320. The Monte Carlo simulation system may perform the process of calculating the equivalent differential importance value in step S301 and the process of calculating the expected value for the sensitivity in step S302 only with regard to the parameters designated typically by the user.

Figure 4:
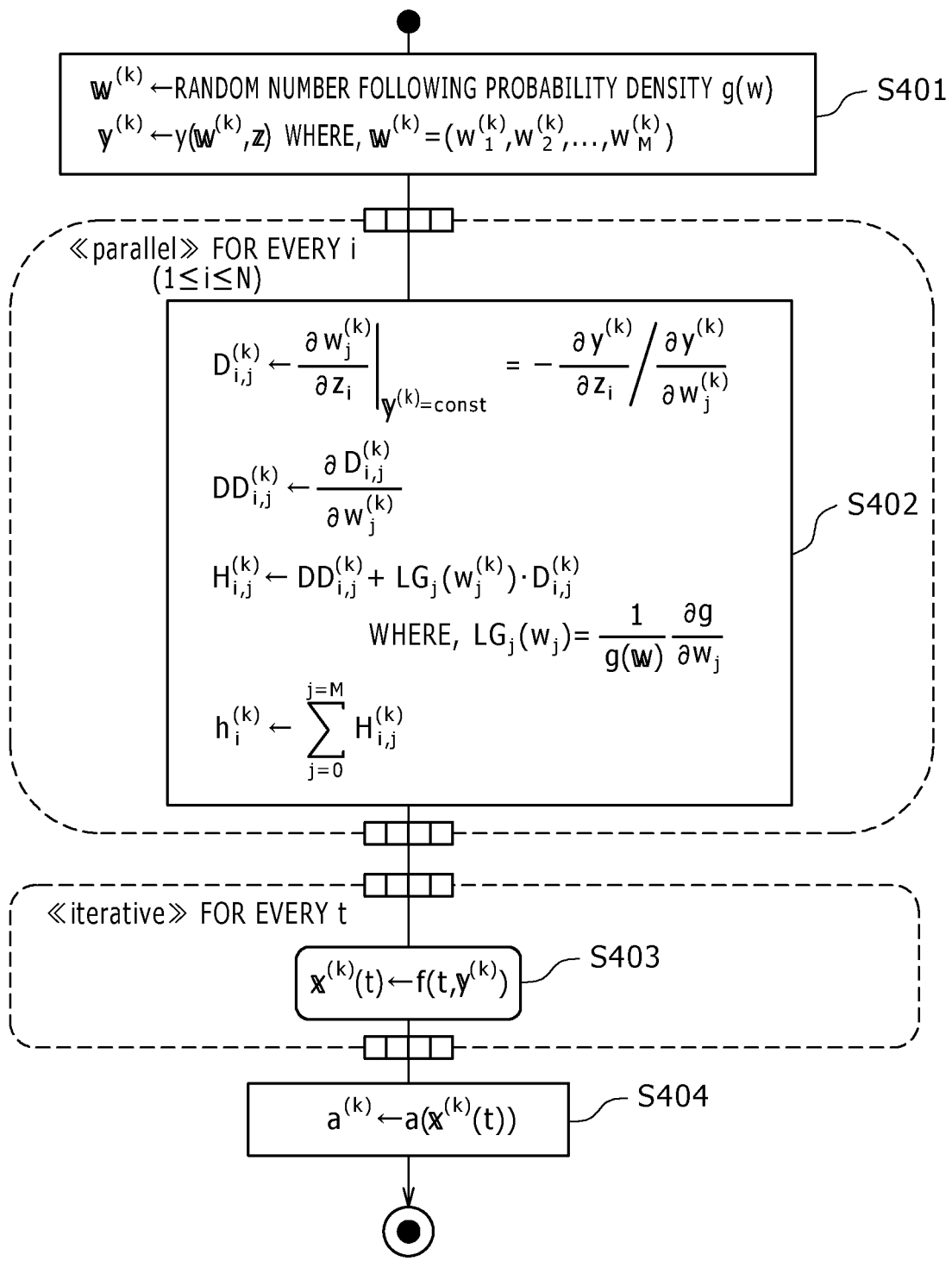
FIG. 4 is a flowchart showing an example of how the simulation is run by the first embodiment.

Incidentally, if the time series x(t) indicative of the system behavior is given by the mathematical expression 15 or 17, it is possible to use the sensitivity estimation method of the first embodiment with regard to the parameter of the expected value for the index of interest as mentioned above. FIGS. 3 and 4 show details of the simulation execution process performed for the k-th time when the time series x(t) indicative of the system behavior is calculated using the models defined by the mathematical expressions 15 and 17.

FIG. 4 shows details of a typical simulation execution process performed where the time series x(t) indicative of the system behavior is given by the mathematical expression 15, i.e., where if the random number vector w and the parameter z determine the value y(w, z), then the system state x(t) at a time t is defined deterministically by the time t and the value y alone.

The scenario simulator 200 first generates the random number vector $w^{(k)}$, and calculates $y^{(k)}$ from the vector $w^{(k)}$ and the parameter z (S401). Specifically, the random number generation part 210 generates the M-dimensional random number vector $w^{(k)}$ following a predetermined probability density function g(w), and transmits the generated random number to the model behavior updating part 220 and random number importance value calculation part 230. The random number generation part 210 may generate the random number vector using known means such as a pseudorandom number generation algorithm or a physical random number generator. The model behavior updating part 220 calculates $y^{(k)}$ by substituting the received $w^{(k)}$ and a given N-dimensional parameter value z into the relational expression y(w, z).

The scenario simulator 200 then calculates the equivalent differential importance value $h_i^{(k)}$ for each of N parameters (S402). This process is needed to estimate the sensitivity regarding the parameters of the expected value for the index of interest. The processing defined by the weight function includes this process. The scenario simulator 200 may perform the process in step S402 only on the parameters designated typically by the user. The equivalent differential importance value $h_i^{(k)}$ for the i-th parameter is calculated specifically in four steps that will be explained below. That is, step S402 includes the following four steps.

The first step is a step in which the sample path fixed differential computation part 231 calculates $D_{i,j}^{(k)} = (\partial w_j^{(k)}/\partial z_i)|_{x=const}$, which is a relationship between the j-th element of the random number vector $w^{(k)}$ and the infinitesimal change of the i-th parameter, the relationship being such as to keep the system behavior x constant. In this case, the subscript j represents the calculation regarding the j-th element of the M-dimensional random number vector $w_{(k)}$.

If the time series x(t) indicative of the system behavior is given by the mathematical expression 15, the mathematical expression 16 holds. Thus the sample path fixed differential computation part 231 need only obtain $(\partial w_j/\partial z_i)|_{(y[<]BEGINITALm(k)=const)}$. That is, if a function—$(\partial y^{(k)}/\partial z_i)/(\partial y^{(k)}/\partial w_j^{(k)})$ is given typically by the user, the sample path fixed differential computation part 231 may calculate $D_{i,j}^{(k)}$ by substituting the input parameter $z_i$ and the input random number vector $w_j^{(k)}$ into the function. Based on this function, the sample path fixed differential computation part 231 may calculate $D_{i,j}^{(k)}$ at high speed.

Also, the sample path fixed differential computation part 231 may numerically search the infinitesimal changes $\Delta z_i$ of the parameter for a value $\Delta w$ that keeps y constant, and calculate $\Delta w/\Delta z_i$ so as to approximate $(\partial w_j/\partial z_i)|_{(y[<]BEGINITALm(k)=const)}$, i.e., $D_{i,j}^{(k)}$. For example, even if the user does not know the specific function of x and y, the sample path fixed differential computation part 231 can calculate $D_{i,j}^{(k)}$ by the method described above. The sample path fixed differential computation part 231 transmits the calculated $D_{i,j}^{(k)}$ to the sample path fixed second-order differential computation part 232 and random number importance value computation part 233.

The second step is a step in which the sample path fixed second-order differential computation part 232 differentiates the received $D_{i,j}^{(k)}$ with respect to $w_j^{(k)}$. The result from differentiating the $D_{i,j}^{(k)}$ with regard to $w_j^{(k)}$ is written as $DD_{i,j}^{(k)}$. For example, the sample path fixed second-order differential computation part 232 may calculate $DD_{i,j}^{(k)}$ by numerically differentiating the received $D_{i,j}^{(k)}$. If a function for calculating $DD_{i,j}^{(k)}$ is given, the sample path fixed second-order differential computation part 232 may calculate $DD_{i,j}^{(k)}$ by substituting the input parameter $z_i$ and the input random number vector $w_j^{(k)}$ into the given function. The sample path fixed second-order differential computation part 232 transmits the calculated $DD_{i,j}^{(k)}$ to the random number importance value computation part 233.

The third step is a step in which the random number importance value computation part 233 calculates a random number importance value $H_{i,j}^{(k)}$ regarding the j-th element $w_j^{(k)}$ of the random number vector $w^{(k)}$. The third step is equivalent to calculating the terms in the summation sign of the mathematical expression 8. Specifically, the random number importance value computation part 233 may calculate the random number importance value $H_{i,j}^{(k)}$ by substituting into the indicated relational expression shown in FIG. 4 the received $D_{i,j}^{(k)}$, the received $DD_{i,j}^{(k)}$, and a value $LG_j(w_j^{(k)}) = (1/g(w_j^{(k)})) \times (\partial g/\partial w_j^{(k)})$ obtained by substituting the random number vector $w_j^{(k)}$ into the function LG defined uniquely by a predetermined probability density function g(w). The random number importance value computation part 233 stores the calculated $H_{i,j}^{(k)}$ into the random number importance value storage part 250.

If the M-dimensional vector w is a uniformly distributed random number random vector, or if the vector w is a random number vector of M-dimensional independent standard normal distribution, the calculations in the third step are defined by the mathematical expression 11 or 12, respectively, as described above. Thus if the random number $w_j^{(k)}$ follows uniform distribution, the random number importance value is given as $DD_{i,j}^{(k)}$ in accordance with the mathematical expression 11. For this reason, the random number importance value calculation part 230 may calculate the random number importance value by performing the first step alone. The scenario simulator 200 performs the processing from the first step to the third step with regard to all j (where J=1, . . . , M).

The fourth step is a step in which the equivalent differential importance value calculation part 270 calculates the equivalent differential importance value $h_i^{(k)}$ regarding the i-th parameter. The fourth step corresponds to the summation calculation performed with the mathematical expression 8 mentioned above. The equivalent differential importance value calculation part 270 obtains the random number importance value $H_{i,j}^{(k)}$ from the random number importance value storage part 250 and calculates the sum of j. Since the calculations of the equivalent differential importance value $h_i^{(k)}$ regarding the individual parameters $z_i$ are independent of one another, the calculations of the equivalent differential importance values with respect to N parameters $z_1, \ldots, z_N$ may be performed not successively by a single scenario simulator 200 but parallelly by numerous computers for example.

The model behavior updating part 220 then calculates the system behavior $x^{(k)}(t)$ by actually running simulations (S403). The model behavior updating part 220 may perform the process by successively calculating the system state at a time t while letting the time t progress from initial time to end time. Alternatively, some other known method of efficient simulation-based calculation may be used. The model behavior updating part 220 stores the calculated $x^{(k)}(t)$ into the model behavior storage part 240. The process in step S403 may be performed in parallel with or prior to the process in step S402.

The index calculation part 260 proceeds to obtain the system behavior $x^{(k)}(t)$ from the model behavior storage part 240 and calculate the evaluation value of the index of interest, i.e., the system behavior evaluation function $a^{(k)}$ (S404). The index calculation part 260 stores the calculated $a^{(k)}$ into the index value storage part 310.

As described above, when the time series x(t) indicative of the system behavior is given by the mathematical expression 15, the scenario simulator 200 performs the processing shown in FIG. 4 to calculate the system behavior evaluation function $a^{(k)}$ and the equivalent differential importance value $h_i^{(k)}$ with regard to each of N parameters.

Figure 5:
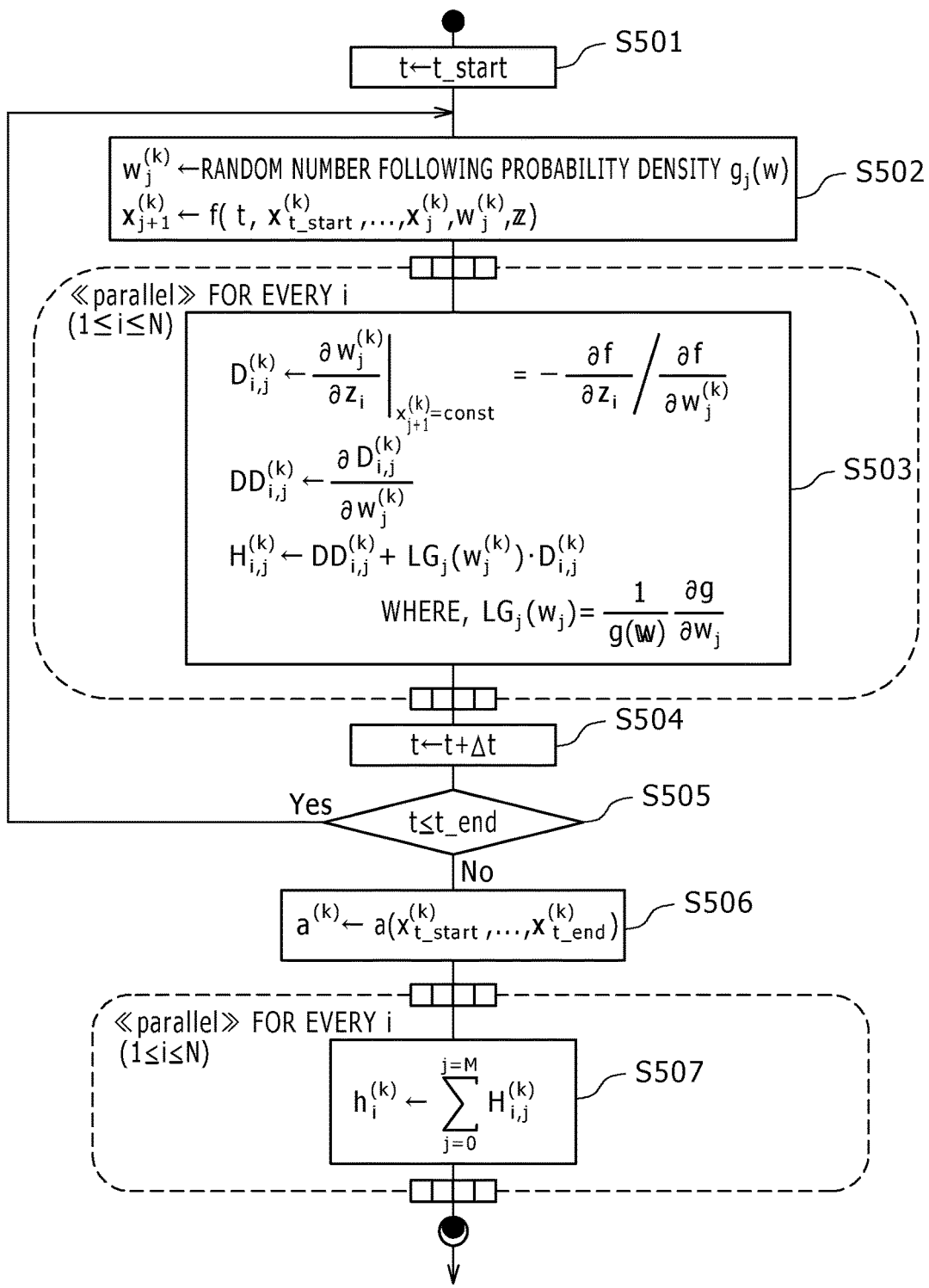
FIG. 5 is a flowchart showing another example of how the simulation is run by the first embodiment.

FIG. 5 shows details of the simulation execution process performed when the time series x(t) indicative of the system behavior is given by the mathematical expression 17, i.e., when the system state x(t+1) at a time t+1 is determined by the time t, by the system behavior in the past (before time t), by a random number $w_j$ generated anew at the time t (i.e., varying at each time, such as a random number vector including multiple random numbers), and by a parameter z.

In running simulations, the scenario simulator 200 repeats the process of calculating the system state $x^{(k)}(t)$ at the time t and the random number importance value $H_{i,j}^{(k)}$ regarding the j-th random number $w_j^{(k)}$ for all of N parameters while letting the time t progress from a simulation start time t_start to a simulation end time t_end in steps of a simulation time step $\Delta t$. The scenario simulator 200 further calculates the system behavior evaluation function $a^{(k)}$ and the equivalent differential importance value $h_i^{(k)}$ for each of the N parameters using the time series of the system behavior $x^{(k)}(t)$ obtained through the simulations.

The simulation control part 280 first sets the time t to the simulation start time t_start and notifies the components in the scenario simulator 200 of the start of loop processing with regard to the time t (S501). The loop processing with regard to the time t includes two processes: a process in which the model behavior updating part 220 calculates the system state $x^{(k)}(t)$ at the time t (S502), and a process in which the random number importance value calculation part 230 calculates the random number importance value $H_{i,j}^{(k)}$ with regard to each of the N parameters of the random number generated at the time t (S503).

The specific process in step S502 is described below. The random number generation part 210 first generates the random number $w_j^{(k)}$ necessary for calculating the system state $x^{(k)}(t)$ at the time t in accordance with a predetermined probability density function g(w). The random number generation part 210 transmits the generated random number $w_j^{(k)}$ to the model behavior updating part 220 and random number importance value calculation part 230. The model behavior updating part 220 calculates the system state $x^{(k)}(t)$ at the time t by substituting the received random number $w_j^{(k)}$, the system behavior in the past (before time t), the parameter z, and the time t into a given recurrence formula (mathematical expression 17).

The random number importance value calculation part 230 then calculates the random number importance value $H_{i,j}^{(k)}$ regarding the parameters of the random number $w_j^{(k)}$ generated at the time t for each of N parameters $z_1, \ldots, z_N$ (S503). The scenario simulator 200 may perform the process in step S503 only on the parameters designated typically by the user.

The random number importance value $H_{i,j}^{(k)}$ regarding the i-th parameter is calculated specifically in three steps, to be described below. That is, step S503 includes these three steps. Since the calculations of the equivalent differential importance value $h_i^{(k)}$ regarding the individual parameters are independent of one another, the calculations of the equivalent differential importance values with respect to N parameters $z_1, \ldots, z_N$ may be performed not successively by a single scenario simulator 200 but parallelly by numerous computers for example.

The first step is a step in which the sample path fixed differential computation part 231 obtains $D_{i,j}^{(k)} = (\partial w_j^{(k)}/\partial z_i) |_{x\_j+1[<]BEGINITALm(k)=const}$, which is a relationship between the random number $w_j^{(k)}$ and the infinitesimal change of the i-th parameter, the relationship being such as to keep the system behavior x constant.

If a function—$(\partial f/\partial z_i)/(\partial f/\partial w_j^{(k)})$—is given, the sample path fixed differential computation part 231 may calculate $D_{i,j}^{(k)}$ by substituting the input parameter $z_i$ and the input random number $w_j^{(k)}$ into the function. Alternatively, the sample path fixed differential computation part 231 may approximate $(\partial w_j/\partial z_i)|_{x(t)=const}$, i.e., $D_{i,j}^{(k)}$, by numerically searching a value $\Delta w$ that keeps f constant with regard to the infinitesimal changes $\Delta z_i$ of the parameters and then calculating $\Delta w/\Delta z_j$. The sample path fixed differential computation part 231 transmits the calculated $D_{i,j}^{(k)}$ to the sample path fixed second-order differential computation part 232 and random number importance value computation part 233.

The second step is a step in which the sample path fixed second-order differential computation part 232 differentiates the received $D_{i,j}^{(k)}$ with respect to $w_j^{(k)}$ to calculate $DD_{i,j}^{(k)}$. The second step is the same as the second step in step S402.

The third step is a step in which the random number importance value computation part 233 calculates the random number importance value $H_{i,j}^{(k)}$ with respect to the random number $w_j^{(k)}$ at the time t. The third step is the same as the third step in step S402.

The simulation control part 280 then sets the time to t+$\Delta t$ (S504). If the time t+$\Delta t$ is earlier than the simulation end time t_end ("Yes" in step S505), the Monte Carlo simulation overall control part 500 restarts the scenario simulator 200. The scenario simulator 200 performs the processing ranging from step S502 to step S504.

If the time t+$\Delta t$ is later than the simulation end time t_end ("No" in step S505), the index calculation part 260 obtains the time series of the system behavior $x^{(k)}(t)$ from the model behavior storage part 240 and calculates the evaluation value of the index of interest, i.e., the system behavior evaluation function $a^{(k)}$ (S506). The index calculation part 260 stores the calculated $a^{(k)}$ into the index value storage part 310.

The equivalent differential importance value calculation part 270 then calculates the equivalent differential importance value $h_i^{(k)}$ with respect to the i-th parameter by obtaining $H_{i,j}^{(k)}$ regarding all j from the random number importance value storage part 250 and by calculating the sum of j (S507). Alternatively, the equivalent differential importance value calculation part 270 may perform the process in step S507 only on the parameters designated typically by the user. The process in step S506 and the process in step S507 may be performed in parallel or in sequence in different orders. The processing defined by the weight function includes the processes in steps S503 and S507.

As described above, when the time series x(t) indicative of the system behavior is given by the mathematical expression 17, the scenario simulator 200 performs the processing shown in FIG. 5 to calculate the system behavior evaluation function $a^{(k)}$ and the equivalent differential importance value $h_i^{(k)}$ with regard to each of N parameters.

Figure 6:
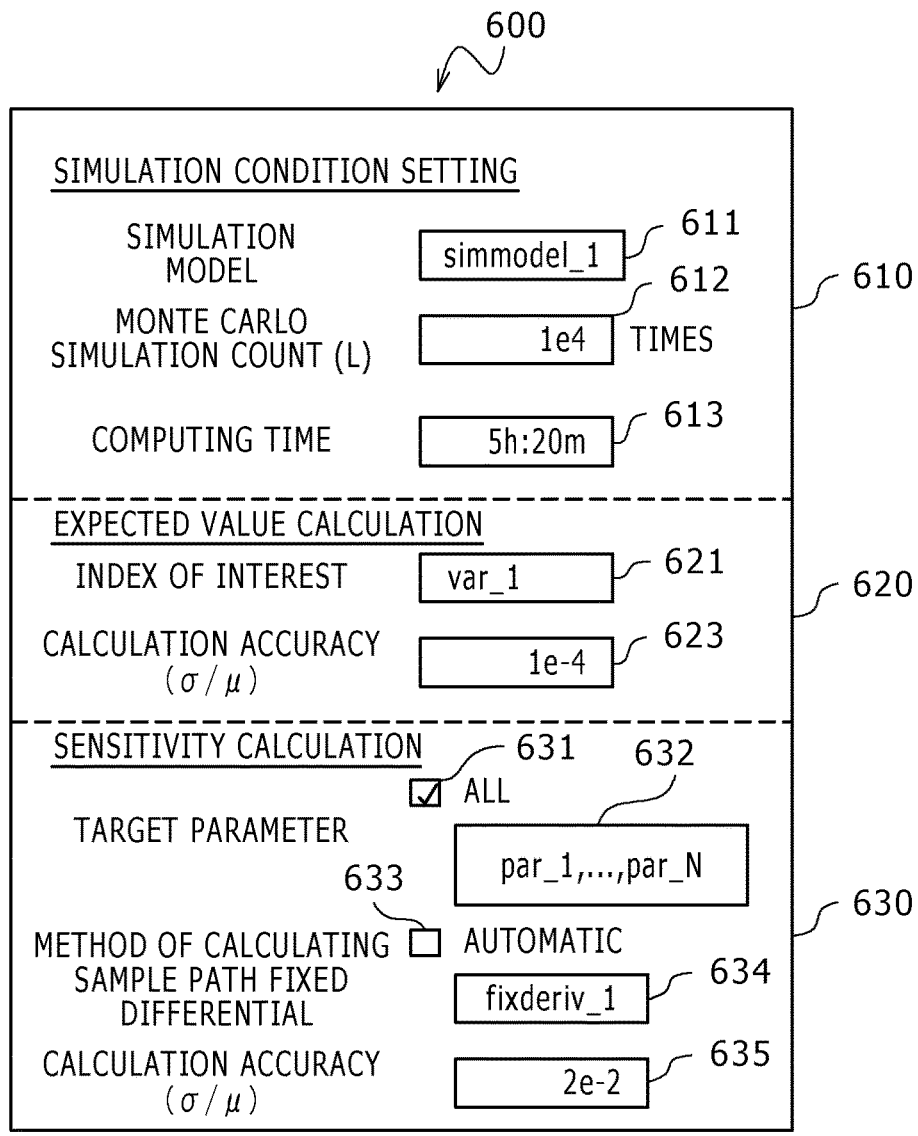
FIG. 6 is a schematic view showing a typical user interface of the Monte Carlo simulation system as the first embodiment.

FIG. 6 shows a typical user interface of the Monte Carlo simulation system of the first embodiment. The user interface 600 includes a simulation condition setting section 610, an expected value calculation section 620, and a sensitivity calculation section 630.

The simulation condition setting section 610 includes input reception sections 611 and 612, and a display section 613. The input reception section 611 receives the input of a simulation model, i.e., a function x(w, t) that defines the realized values x of the system behavior, for example. The input reception section 612 receives the input of the number of simulations to be run using the input simulation model. The display section 613 displays the computing time needed to calculate the simulations of which the details have been input through the input reception sections 611 and 612.

The expected value calculation section 620 includes an input reception section 621 and a display section 622. The input reception section 621 receives the input of the index of interest, i.e., the system behavior evaluation function a(x). The display section 622 displays the calculation accuracy of the system evaluation function A(x).

The sensitivity calculation section 630 includes input reception sections 632 and 634, check boxes 631 and 633, and a display section 635. The input reception section 632 receives the input of the parameters targeted for sensitivity calculation, i.e., the parameters $z_i$ for which the sensitivity $\partial A/\partial z_i$ is to be calculated. The check box 631 is checked to select all parameters $z_i$ as the parameters targeted for sensitivity calculation. The input reception section 634 receives the input of the method for calculating $D_{i,j}$. The check box 633 is checked to select automatically the method of calculating $D_{i,j}$. The display section 635 displays the calculation accuracy of the sensitivity $\partial A/\partial z_i$.

In the user interface 600, the input and the display sections are interchangeable between them. Each of the input and the display sections may double as the other type of section. For example, the display section 622 may receive the input of the calculation accuracy of the system evaluation function A(x), and the display section 635 may receive the input of the calculation accuracy of the sensitivity $\partial A/\partial z_i$. In this case, the input reception section 611 may display the number of simulations necessary for guaranteeing both the calculation accuracy of the input system evaluation function A(x) and the calculation accuracy of the input sensitivity $\partial A/\partial z_i$.

As described above, the Monte Carlo simulation system of the first embodiment calculates the sensitivity regarding each parameter of the system evaluation function using the result of a single set of Monte Carlo simulations. In so doing, the Monte Carlo simulation system can cut down on computing time and computing resources.

By use of the sensitivity calculated by the Monte Carlo simulation system of the first embodiment, the user may proceed with parameter optimization, i.e., may search an allowable range of parameter values for a parameter value that maximizes the system evaluation function.

Second Embodiment

A second embodiment of the invention to be described below is a means which, given a stochastic model having numerous parameters, runs a single set of Monte Carlo simulations to obtain the sensitivity (differential coefficient) regarding all of the many parameters of the expected value for the index of interest simultaneously, the means being applied for example to the design of electronic circuits constituting a semiconductor integrated circuit with variations during production taken into consideration.

The second embodiment is an example in which, if the time series x(t) indicative of the system behavior is given by the mathematical expression 15, i.e., if a random number vector w and a parameter z determine a value y(w, z), then the system state x(t) at a time t is defined deterministically by the time t and the value y alone (corresponding to FIG. 3).

Higher integration in recent years of semiconductor integrated circuits has entailed growing variations in characteristics of the individual transistors making up each integrated circuit. The variations in characteristics of the individual transistors constituting the integrated circuit typically result from inevitable stochastic phenomena occurring during semiconductor circuit production, such as varying physical sizes of circuit elements to be formed, varying numbers of impurity ions to be injected into the substrate, or varying numbers of faulty grids. That is, the integrated circuit needs to be designed on the assumption that the characteristics of the individual transistors are stochastically variable.

For that reason, it is common practice to model the variations in characteristics of transistors by probability distribution, before estimating through Monte Carlo simulations the magnitude of the expected values and variations of the characteristics of all circuits, or the yield of the integrated circuit, i.e., the probability that the characteristics of all circuits making up the integrated circuit fall into a desired range, for example. Circuit designers repeat the process of tuning the design parameters and verifying transistor characteristics with variations taken into account by running Monte Carlo simulations, until given specifications are met by the characteristics of the designed circuit with the variations duly taken into consideration.

The design parameters for individual transistors include about 10 parameters related to their variations, power, and layout area, such as gate width W, gate length L, diffusion layer width LOD, and transistor-to-transistor distance PDX. That means the number of design parameters for circuit blocks is generally about 10 times as many as the number of the transistors making up the circuit. This can lead to a very large number of design parameters generated for complex circuit blocks made up of numerous transistors. It is thus difficult to tune manually the individual design parameters as mentioned above.

By contrast, the method of the second embodiment involves simply running a single set of Monte Carlo simulations to obtain the sensitivity (differential coefficient) regarding numerous parameters of the expected value for a given index of interest. Using the method of the second embodiment allows the circuit designers not only to obtain the characteristics of all circuit blocks (performance expectation values and yield) and power values under the current parameter settings but also to acquire simultaneously the sensitivity of how all parameters about all transistors affect the characteristics of all circuit blocks (performance expectation values and yield) and power values.

As a result, the circuit designers are able to know, for example, that changing a specific parameter or parameters of a specific transistor or transistors improves the characteristics without incurring increase in power consumption and without blindly tuning the parameters. This provides a significant improvement in design efficiency.

Figure 7:
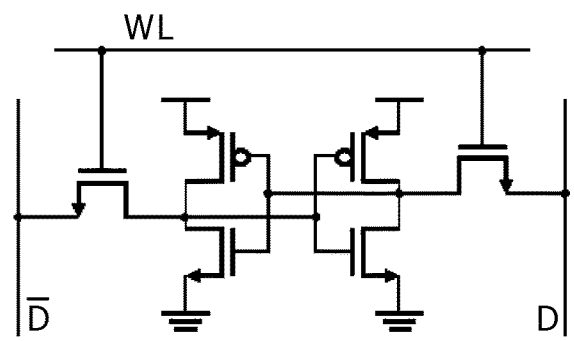
FIG. 7 is a circuit diagram showing a typical static random access memory (SRAM) cell circuit made up of six transistors as a second embodiment.

FIG. 7 shows a typical static random access memory (SRAM) cell circuit made up of six transistors. The SRAM cell needs to achieve two conflicting characteristics: the value stored in the SRAM cell must normally remain unchanged, and the value stored in the SRAM cell must be duly rewritten as intended upon update.

The actual parameter values of the individual transistors making up a finished integrated SRAM circuit do not conform to the exact design values but disperse in keeping with a certain probability distribution due to variations of the integrated circuit during production, for example. This can lead to defects such as the loss of a normally stored value in an SRAM cell or a failure to rewrite the stored value in an SRAM cell as intended upon update.

Consequently, the circuit designers are required to vary design parameter values and put them through Monte Carlo simulations in order to optimize the design parameters so that the rejection rate of actually manufactured SRAM cell circuits falls below a given threshold value. The simulation method of the Monte Carlo simulation system according to the first embodiment is applied to this case.

The parameter vector z of the second embodiment is constituted from the design parameters of transistors. For example, if each transistor has 10 design parameters, the parameter vector z of an SRAM cell circuit formed by six transistors is a 60-dimensional vector.

As discussed above, the variations in characteristics of the SRAM circuit result from the actual parameter values of transistors being varied during production. That is, given the 60-dimensional design parameters z determining the characteristics of the transistors, there are actually generated 60-dimensional parameters y due to variations during production for example.

The random number generation part 210 generates a multi-dimensional random number vector w in accordance with a probability density function g(w) at each simulation. The model behavior updating part 220 determines actual post-production parameter values y by the function y=y(w, z) based on the random number vector w and 60-dimensional design parameter vector z. In this case, it is assumed that the probability density function g(w) and function y(w, z) to be followed by the random number vector w are defined in such a manner that the probability distribution of the actual post-production parameter values y represents the variations during production where the design parameter vector is z.

Once the actual post-production parameters y are determined, the model behavior updating part 220 can determine the behavior x(t) of the SRAM cell circuit deterministically using ordinary circuit simulations. Thus the time series x(t) indicative of the system behavior in the second embodiment is given by the mathematical expression 15. That is, the system state x(t) at a time t is defined deterministically by the time t and y alone upon determination of the value y(w, z) by the random number vector w and the parameter vector z. If the system behavior evaluation function a(x) is defined to be 0 when the behavior of the cell of interest is within a normal operating range and 1 if the behavior is faulty, then the system evaluation function A(x), i.e., the expected value E[a(x)] for a(x) represents the rejection rate of the SRAM cell.

Thus the Monte Carlo simulation system can calculate the sensitivity for all 60 design parameters regarding the rejection rate of SRAM cells by performing the processing described above with reference to FIG. 4. Given the sensitivity values thus calculated, the Monte Carlo simulation system may further calculate a combination of 60 design parameter values that minimizes SRAM cell rejection rate by use of a known optimizing method such as the gradient method or the Newton method.

As described above, the Monte Carlo simulation system of the second embodiment efficiently obtains the optimal design parameter values that take into consideration the variations during production of the electronic circuits in the semiconductor integrated circuit made up of numerous transistors.

Third Embodiment

A third embodiment of the invention to be described below is a means which, given a stochastic model having numerous parameters, runs a single set of Monte Carlo simulations to obtain the sensitivity (differential coefficient) regarding all of the many parameters of the expected value for the index of interest simultaneously, the means being applied for example to the financial field, particularly to a profit forecast simulation system for banks. The time series x(t) indicative of the system behavior in the third embodiment is given by the mathematical expression 17. That is, the system state x(t+1) at a time t+1 is defined by the time t, by the system behavior in the past (before time t), by a random number $w_j$ generated anew at the time t (varying every time), and by a parameter z.

When a future business plan is worked out at a financial institution, the management determines the feasibility of the plan by projecting future billings and profits with regard to the currently offered financial products.

FIG. 8 shows a typical income and expenditure plan for a bank. The leftmost column in the plan indicates the items of the financial products offered by the bank. For example, the financial products may cover four items: business loans for corporations, housing loans for individuals, card loans, and dividends on securities owned by the bank, each item including three categories A to C.

An actual bank may have thousands of financial product items. Each line in the plan above indicates the billings of the corresponding financial product item over the periods shown in the top line. For example, if the present time is assumed to be at the end of the second quarter of 2014 ('14/2Q), then the billings of '14/1Q and '14/2Q are actual values while the billings of '14/3Q and beyond are the values planned at the present time (at the end of the second quarter of 2014). In the example of FIG. 8, the plan shows the billings spanning a total of six periods of an annual quarter each. At an actual bank, the plan may span about five years at intervals of a month or a week. In such a case, the income and expenditure plan may include hundreds of periods.

The relations between the billings and profits of each item are primarily dependent on the bank's borrowing rate, i.e., the spot rate. The relations between the spot rate and the profits can be modeled for each item with a fairly high degree of accuracy. On the other hand, the future spot rate is unpredictable and can only be estimated stochastically.

Under such circumstances, the bank's management determines the feasibility of a given business plan by running Monte Carlo simulations to obtain the expected values and variations of the profits. Specifically, a process is repeated many times in which a realization path of the future spot rate is first generated using random numbers; the profit values are then calculated on the basis of the billings planned for the items; and the profits of all items are totaled to calculate the profit values for the entire bank. Repeating the process a large number of times allows the expected values and variations of the profits for the entire bank to be estimated under the given business plan.

For the bank, it is not enough to obtain the expected values and variations of the profits for the entire bank on the assumption that the future billings planned for the items will all be achieved. The future billings planned for the items are expected obviously to deviate from the planned values. In working out the business plan, it is necessary to consider in advance the effects of the discrepancies that may occur between the planned values and the actual values in the future.

Specifically, it is necessary to calculate how deviations from the billings planned for each of thousands of items over hundreds of periods in the future, i.e., deviations from each of about hundreds of thousands of planned values, affect the profits of the entire bank. If it is found that slight deviations of the actual values from the planned values significantly affect the profits of the entire bank, then it is necessary to take appropriate measures such as setting aside adequate reserves or revising the business plan altogether.

Explained below is an example of applying the method of simulation by the Monte Carlo simulation system of the first embodiment to the profit forecast simulation of a bank.

The parameter vector z of this embodiment represents the billings planned over each future period for each of all items involved. For example, if there are thousands of items spanning hundreds of periods, then the parameter vector z is a vector of hundreds of thousands of dimensions. The time series x(t) indicative of the system behavior is, for example, a multi-dimensional vector that combines an aggregate of the profit values of all items over the future periods (e.g., this can be a vector of thousands of dimensions) and the spot rate as the interest rate in effect.

The profit value of each item in the t-th period is dependent on the spot rate and on the parameter z denoting the billings planned for each item at the current time, for example. The future spot rate is expressed by a stochastic model such as the Hull-White model, Cox-Ingersoll-Ross (CIR) model, or Black-Derman-Toy (BDT) model. These models determine the spot rate at the time t+1 based on the spot rate at the time t and on a random number (generated anew at time t).

Thus the system behavior x(t) with this embodiment is defined as a whole by the mathematical expression 17. That is, the system state x(t+1) at the time t+1 is determined by the time t, by the system behavior in the past (before time t), by the random number $w_j$ generated anew at the time t (varying every time), and by the parameter z.

The system behavior evaluation function a(x) is the sum of the profits of all items spanning all periods, for example. In this case, the system evaluation function A(x), i.e., the expected value E[a(x)] for a(x), indicates the expected values of the future profits for the entire bank under the given plan.

The Monte Carlo simulation system of the third embodiment performs the processing shown in FIG. 5 under the above-mentioned assumption to estimate the billings planned over each of hundreds of future periods for each of thousands of items, i.e., to estimate the sensitivity regarding the expected values of the profits for the entire bank with respect to each of the hundreds of thousands of planned values simultaneously.

Based on the estimated sensitivity, the bank can take measures such as setting aside reserves to prepare for the effects of discrepancies between planned and actual values or revising the business plan altogether.

As described above, the Monte Carlo simulation system of the third embodiment is capable of estimating the sensitivity regarding the profits on the planned values in the profit forecast simulation system particularly for banks in the financial field. This allows the banks to execute the process of working out business plans more efficiently than before.

Fourth Embodiment

The Monte Carlo simulation system of a fourth embodiment of the invention calculates the boundary residual $R_i$, in the mathematical expression 9 of the first embodiment. As discussed above with the boundary residual $R_i$, when $(\partial w/\partial z_i)|_{x=const}=0$ (vector) on an interface (boundary surface) $\partial \Omega$ of the distribution range $\Omega$ of the random number vector w, $R_i=0$. In practice, there are thought to be many cases in which $R_i=0$ because the above condition often holds for the systems targeted for the Monte Carlo simulation.

However, the above condition fails to hold when the random number vector is a uniformly distributed random number, for example. In such a case, the boundary residual $R_i$ may have to be specifically calculated. There may be two methods of calculating the boundary residual $R_i$: based on the first line in the mathematical expression 9, and based on the third line in the same expression.

Figure 9:
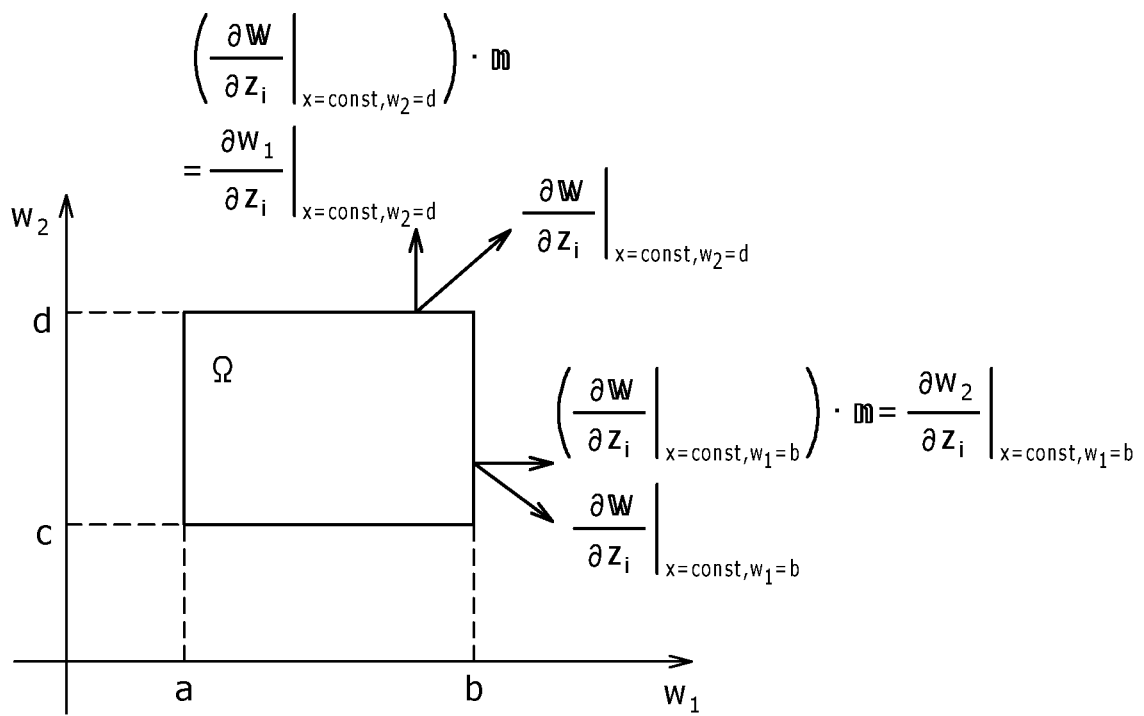
FIG. 9 is a conceptual view showing a typical concept of how to calculate the boundary residual where a random number vector follows a two-dimensional uniform distribution as a fourth embodiment.

FIG. 9 shows a typical concept of how to calculate the boundary residual $R_i$ where the random number vector w is a two-dimensional vector having two elements: a uniformly distributed random number vector $w_1$ over an interval [a, b] and a uniformly distributed random number vector $w_2$ over an interval [c, d]. The area indicated by a rectangle in FIG. 9 is the range $\Omega$. The probability density function g(w) is given by the following mathematical expression 19:

$$g(w_1, w_2) = \begin{cases} \dfrac{1}{(b-a)(d-c)} & \text{if } a \leq w_1 \leq b, \\ & c \leq w_2 \leq d \\ 0 & \text{otherwise} \end{cases}$$

Mathematical Expression 19

The storage part 300 of the fourth embodiment includes a sample path fixed differential storage part 330 (not shown). The sample path fixed differential storage part 330 holds $D_{i,j}$ calculated by the sample path fixed differential computation part 231. The post-processing calculation part 400 of the fourth embodiment includes a boundary residual calculation part 430 (not shown), which is a program. The boundary residual calculation part 430 inputs the random number vector w, parameter vector z, and $D_{i,j}$ received from the sample path fixed differential storage part 330, and calculates the boundary residual $R_i$. The boundary residual calculation part 430 transmits the calculated boundary residual $R_i$ to the expected value calculation part 410.

Described below are the two methods of calculating the boundary residual $R_i$ using an example in which a probability density function g followed by the random number vector w is given by the mathematical expression 19. The first method by which the boundary residual calculation part 430 calculates the boundary residual $R_i$ is based on the first line of the mathematical expression 9. Under the condition of FIG. 9, the first line of the mathematical expression 9 is expanded as shown in the following mathematical expression 20:

$$R_i = \int_{\partial\Omega} a(x)g(w)\left(\frac{\partial w}{\partial z_i}\bigg|_{x=const}\right) \cdot n dw \quad \text{Mathematical Expression 20}$$

$$= \int_c^d a(x)g(b, w_2)\frac{\partial w_2}{\partial z_i}\bigg|_{x=const} dw_2 - \int_c^d a(x)g(a, w_2)\frac{\partial w_2}{\partial z_i}\bigg|_{x=const} dw_2 +$$

$$\int_a^b a(x)g(w_1, d)\frac{\partial w_1}{\partial z_i}\bigg|_{x=const} dw_1 - \int_a^b a(x)g(w_1, c)\frac{\partial w_1}{\partial z_i}\bigg|_{x=const} dw_1.$$

Thus the boundary residual calculation part 430 obtains a value by subtracting the integrated value calculated by $(\partial w_2/\partial z_i)|_{x=const}$ where $w_2$ is varied, with $w_1$ fixed to a boundary value a, from the integrated value calculated by $(\partial w_2/\partial z_i)|_{x=const}$ where $w_2$ is varied, with $w_1$ fixed to b, which is a boundary value of $\Omega$. The boundary residual calculation part 430 further obtains a value by subtracting the integrated value calculated by $(\partial w_1/\partial z_i)|_{x=const}$ where $w_1$ is varied, with $w_2$ fixed to a boundary value c, from the integrated value calculated by $(\partial w_1/\partial z_i)|_{x=const}$ where $w_1$ is varied, with $w_2$ fixed to d, which is a boundary value of $\Omega$. The boundary residual calculation part 430 then calculates the sum of the two values thus obtained.

The boundary residual calculation part 430 obtains the boundary residual $R_i$ by adding up the two calculated values. The boundary residual calculation part 430 may calculate the above-mentioned individual integrated values using a known numerical integration method, for example.

The second method by which the boundary residual calculation part 430 calculates the boundary residual $R_i$ is based on the third line of the mathematical expression 9. The third line of the mathematical expression 9 involves integrating the entire random number vector distribution range $\Omega$. For this reason, given the following mathematical expression 21, the boundary residual calculation part 430 calculates the boundary residual $R_i$ as an expected value using Monte Carlo simulations:

$$R_i = \int_\Omega \left\{\frac{1}{g(w)}div\left[a(x)g(w)\left(\frac{\partial w}{\partial z_i}\bigg|_{x=const}\right)\right]\right\} \quad \text{Mathematical Expression 21}$$

$$g(w)dw$$

$$= E\left[\frac{1}{g(w)}div\left[a(x)g(w)\left(\frac{\partial w}{\partial z_i}\bigg|_{x=const}\right)\right]\right]$$

That is, the random number generation part 210 generates numerous random numbers in keeping with a given probability density function g(w). For each random number vector thus generated, the boundary residual calculation part 430 may calculate the values in the square brackets on the second line of the mathematical expression 21 and take an average of the calculated values for the estimated value of $R_i$.

The boundary residual calculation part 430 may calculate div in the mathematical expression 21 by numerical differentiation. If div is given as a function typically by the user, the boundary residual calculation part 430 may calculate div by substituting the parameter vector z and random number vector w into the function. The boundary residual calculation part 430 may calculate the boundary residual $R_i$ in like manner when the probability density function g(w) is a function of other than two-dimensional uniform distribution. The sensitivity calculation part 420 subtracts the boundary residual $R_i$ thus calculated from the calculated average to obtain the difference therebetween. This difference is the estimated value of the sensitivity of interest.

As described above, when the boundary residual $R_i$ is other than zero, the Monte Carlo simulation system of the fourth embodiment is capable of calculating the value of the residual. By calculating the boundary residual $R_i$, the Monte Carlo simulation system can apply the sensitivity calculation method of this embodiment to the random number vector of any distribution used in the model for calculating the system behavior realized value x. That is, the sensitivity calculation method of this embodiment is applicable to all models for calculating the system behavior realized value x.

The present invention is not limited to the embodiments discussed above and may also be implemented in diverse variations. The embodiments above have been explained as detailed examples helping this invention to be better understood. The present invention, when embodied, is not necessarily limited to any embodiment that includes all the structures described above. Part of the structure of one embodiment may be replaced with the structure of another embodiment. The structure of a given embodiment may be supplemented with the structure of another embodiment. Part of the structure of each embodiment may be supplemented with, emptied of, or replaced by another structure.

The above-described structures, functions, processing units, and processing means may be implemented partially or entirely by hardware through integrated circuit design, for example. Also, the above-described structures and functions may be implemented by software in the form of programs which, when interpreted and executed by a processor, bring about the respective functionality. The programs, tables, files, and other data for implementing the functions may be stored in storage devices such as memories, hard disks and SSD (Solid State Drive), or on recording media such as IC cards, SD cards and DVDs.

The illustrated control lines and data lines may not represent all control lines and data lines needed in the apparatus as a product. In practice, almost all structures may be considered to be interconnected.

The invention claimed is:

1. A simulation system for optimizing design parameters of an integrated circuit stochastic system by repeating a simulation of the integrated circuit stochastic system that inputs each of a plurality of random number vectors to calculate a plurality of realized values of behavior of the integrated circuit stochastic system, the simulation system comprising:
a processor configured to perform model behavior updating for the integrated circuit stochastic system and tuning design parameters of an integrated circuit having the integrated circuit stochastic system by receiving user input to run the simulation with at least one of the realized values of the behavior of the integrated circuit stochastic system being varied;

determining the realized values of the behavior of the integrated circuit stochastic system based on a random number vector made up of at least one random number and on a parameter vector made up of at least one transistor parameter;

determining a behavior evaluation value of the integrated circuit stochastic system based on the realized values of the behavior of the integrated circuit stochastic system; and determining, under a condition of keeping constant the realized values of a behavior function corresponding to a random number vector, a first differential coefficient with each of the at least one transistor parameters in the random number vector, and further determining a weight of the random number vector for a transistor parameter of interest based on the first differential coefficient;

tuning the design parameters of the integrated circuit stochastic system, based on the weight of the random number vector for the transistor parameter of interest, wherein the tuning of the design parameters includes manufacturing a set of test integrated circuit stochastic systems, and changing the design parameters of the integrated circuit stochastic system until a rejection rate of the test integrated circuit stochastic systems falls below a given threshold value; and transmitting instructions based on the tuned design parameters to manufacture the integrated circuit stochastic system, wherein the processor is further configured to obtain the plurality of random number vectors and a parameter vector, wherein, based on each of the random number vectors, on the obtained parameter vector, and on the behavior function, the processor calculates the realized values of the behavior of the integrated circuit stochastic system corresponding to each of the obtained random number vectors, wherein, based on each of the obtained random number vectors, on the obtained parameter vector, and on the weight function, the processor calculates the weight of each of the obtained random number vectors with regard to each of the at least one transistor parameters in the obtained parameter vector, wherein, based on each of the calculated realized values and on the behavior evaluation function, the processor calculates the behavior evaluation value of the integrated circuit stochastic system corresponding to each of the obtained random number vectors, wherein, based on the calculated behavior evaluation value corresponding to each of the obtained random number vectors and on the weight of each of the obtained random number vectors with regard to the transistor parameter of interest selected from the obtained parameter vector, the processor calculates a sensitivity of an expected value for the behavior evaluation value of the integrated circuit stochastic system with regard to the selected transistor parameter from a single set of Monte Carlo simulations, and wherein said at least one parameter comprises a plurality of parameters each associated with a variation of a transistor of the integrated circuit.

2. The simulation system according to claim 1, wherein the processor is further configured to determine a second differential coefficient using the random number corresponding to each of the first differential coefficients; and wherein the processor is further configured to determine the weight of the random number vector with regard to the selected transistor parameter based on the second differential coefficient.

3. The simulation system according to claim 2, wherein the weight is determined by the weight function using the following mathematical expression:

$$h_i(w, z) = \sum_{j=1}^{M} \left[ \frac{\partial}{\partial w_j}\left(\frac{\partial w_j}{\partial z_i}\bigg|_{x=const}\right) + \frac{1}{g(w)}\frac{\partial g}{\partial w_j}\left(\frac{\partial w_j}{\partial z_i}\bigg|_{x=const}\right) \right]$$

where, w stands for the random number vector, z for the parameter vector, M for the dimensions of the random number vector, $w_j$ for a j-th element in the random number vector w, $z_i$ for an i-th element in the parameter vector, x for a behavior value of the integrated circuit stochastic system corresponding to the random number vector w, and g for a probability density function followed by the random number vector w.

4. The simulation system according to claim 2, wherein the obtained random number vectors follow uniform distribution; and wherein the weight determined by the weight function is the sum of the second differential coefficients of all random numbers in the random number vectors.

5. The simulation system according to claim 2, wherein the sensitivity of the expected value for the behavior evaluation value of the integrated circuit stochastic system with regard to the selected parameter is expressed by an average of products each obtained by multiplying the calculated behavior evaluation value corresponding to each of the obtained random number vectors by the weight of each of the obtained random number vectors with regard to the selected parameter.

6. The simulation system according to claim 1, wherein the model behavior updating has independent variables including time and a time-independent internal function;

wherein the internal function determines a first vector based on a random vector following a probability distribution and on a parameter vector;

wherein the processor is further configured to determine a single time series of behavior realized values of the integrated circuit stochastic system from a single random number vector;

wherein, based on the single time series, the processor is further configured to determine a single evaluation value of the behavior of the integrated circuit stochastic system;

wherein, under the condition of having the first vector by the internal function kept constant, the processor is further configured to determine the first differential coefficient for each transistor parameter of the random numbers in the random number vector, and the weight of the random number vector with regard to each transistor parameter based on the first differential coefficient;

wherein, based on each of the obtained random number vectors, on the obtained parameter vector, and on the behavior function, the processor calculates the time series of the behavior realized values of the integrated circuit stochastic system corresponding to each of the obtained random number vectors; and wherein, based on each of the calculated time series of the realized values and on the behavior evaluation function, the processor calculates the behavior evaluation value of the integrated circuit stochastic system corresponding to each of the obtained random number vectors.

7. The simulation system according to claim 1,
wherein the behavior function determines the time series of the behavior realized values of the integrated circuit stochastic system;
wherein the processor is further configured to determine the realized value at each time in the time series based on the random number associated with each time and on the realized value at the time preceding each time;
wherein, based on the time series of the behavior realized values of the integrated circuit stochastic system corresponding to a random number vector, the processor is further configured to determine the behavior evaluation value of the integrated circuit stochastic system corresponding to the random number vector;
wherein, under the condition of keeping constant the realized values of the behavior function at the time corresponding to each of the random numbers in the random number vector, the processor is further configured to determine the first differential coefficient for each transistor parameter of the random numbers in the random number vector, and the weight of the random number vector for the transistor parameter of interest based on the first differential coefficient;
wherein, based on each of the obtained random number vectors, on the obtained parameter vector, and on the behavior function, the processor calculates the time series of the behavior realized values of the integrated circuit stochastic system corresponding to each of the obtained random number vectors; and
wherein, based on each of the calculated time series of the realized values and on the behavior evaluation function, the processor calculates the behavior evaluation value of the integrated circuit stochastic system corresponding to each of the obtained random number vectors.

8. The simulation system according to claim 5,
wherein the processor calculates an integrated value of a product obtained through multiplication of the calculated behavior evaluation value corresponding to each of the obtained random number vectors, of the probability that the obtained random number vectors will be generated, and of an inner product obtained by multiplying a vector made up of the first differential coefficients of the random numbers in the obtained random number vectors by an outward unit normal vector of a boundary of the distribution range for a probability density function followed by the obtained random number vectors, the calculated integrated value being over the boundary; and
wherein, based on the average and on the integrated value, the processor calculates the sensitivity of the expected value for the behavior evaluation value of the integrated circuit stochastic system.

9. The simulation system according to claim 5,
wherein the processor calculates divergence of a product obtained through multiplication of the calculated behavior evaluation value corresponding to each of the obtained random number vectors, of the probability that the obtained random number vectors will be generated, and of a vector made up of the first differential coefficients of the random numbers in the obtained random number vectors, the processor further calculating a first expected value for the product of the divergence multiplied by a reciprocal number of the probability that the obtained random number vectors will be generated; and
wherein, based on the average and on the first expected value, the processor calculates the sensitivity of the expected value for the behavior evaluation value of the integrated circuit stochastic system.

10. The simulation system according to claim 1,
wherein, under a condition of changing each of the parameters in the obtained parameter vector, the probability density function followed by the obtained random number vectors has a constant domain with respect to changes of the random number vectors, the changes of the random number vectors keeping constant the realized values of the behavior function corresponding to the random number vectors.

11. A simulation method for use with a simulation system for optimizing design parameters of an integrated circuit stochastic system by repeating a simulation of the integrated circuit stochastic system that inputs each of a plurality of random number vectors to calculate a plurality of realized values of behavior of the integrated circuit stochastic system, the method comprising:
receiving user input to run the simulation with at least one of the realized values of the behavior of the integrated circuit stochastic system being varied;
determining realized values of the behavior of the integrated circuit stochastic system based on a random number vector made up of at least one random number and on a parameter vector made up of at least one transistor parameter;
determining a behavior evaluation value of the integrated circuit stochastic system based on the realized values of the behavior of the integrated circuit stochastic system; and
under the condition of keeping constant the realized values of a behavior function corresponding to a random number vector, determining a first differential coefficient with each of the parameters in the random number vector, and the weight of the random number vector for a transistor parameter of interest based on the first differential coefficient;
obtaining, using a processor, a plurality of random number vectors and a parameter vector;
based on each of the random number vectors, on the obtained parameter vector, and on the behavior function, calculating, using the processor, the realized values of the behavior of the integrated circuit stochastic system corresponding to each of the obtained random number vectors;
based on each of the obtained random number vectors, on the obtained parameter vector, and on the weight function, calculating, using the processor, the weight of each of the obtained random number vectors with regard to each of the transistor parameters in the obtained parameter vector;
based on each of the calculated realized values and on the behavior evaluation function, calculating, using the processor, the behavior evaluation value of the integrated circuit stochastic system corresponding to each of the obtained random number vectors;

based on the calculated behavior evaluation value corresponding to each of the obtained random number vectors and on the weight of each of the obtained random number vectors with regard to the transistor parameter selected from the obtained parameter vector;
calculating, using the processor, a sensitivity of an expected value for the behavior evaluation value of the integrated circuit stochastic system with regard to the selected transistor parameter from a single set of Monte Carlo simulations;
tuning the design parameters of the integrated circuit based on the sensitivity of the expected value for the behavior evaluation value of the integrated circuit stochastic system, wherein the tuning of the design parameters includes
    manufacturing a set of test integrated circuit stochastic systems, and
    changing the design parameters of the integrated circuit stochastic system until given specifications are met by a rejection rate of the test integrated circuit stochastic systems falling below a given threshold value; and
producing the integrated circuit stochastic system based on the tuned design parameters,
wherein said at least one parameter comprises a plurality of parameters each associated with a variation of a transistor of the integrated circuit.

12. The simulation method according to claim 11, further comprising:
determining a second differential coefficient using the random number corresponding to each of the first differential coefficients; and
determining the weight of the random number vector with regard to the selected transistor parameter based on the second differential coefficient.

13. The simulation method according to claim 11,
wherein the weight is determined by the weight function using the following mathematical expression:

$$h_i(w, z) = \sum_{j=1}^{M} \left[ \frac{\partial}{\partial w_j} \left( \frac{\partial w_j}{\partial z_i} \bigg|_{x=const} \right) + \frac{1}{g(w)} \frac{\partial g}{\partial w_j} \left( \frac{\partial w_j}{\partial z_i} \bigg|_{x=const} \right) \right]$$

where, w stands for the random number vector, z for the parameter vector, M for the dimensions of the random number vector, $w_j$ for a j-th element in the random number vector w, $z_i$ for an i-th element in the parameter vector, x for a behavior value of the integrated circuit stochastic system corresponding to the random number vector w, and g for a probability density function followed by the random number vector w.

14. The simulation method according to claim 12,
wherein the obtained random number vectors follow uniform distribution; and
wherein the weight determined by the weight function is the sum of the second differential coefficients of all random numbers in the random number vectors.

15. The simulation method according to claim 12,
wherein the sensitivity of the expected value for the behavior evaluation value of the integrated circuit stochastic system with regard to the selected transistor parameter is expressed by an average of products each obtained by multiplying the calculated behavior evaluation value corresponding to each of the obtained random number vectors by the weight of each of the obtained random number vectors with regard to the selected transistor parameter.

* * * * *